US008582638B2

(12) United States Patent
Earnshaw et al.

(10) Patent No.: US 8,582,638 B2
(45) Date of Patent: Nov. 12, 2013

(54) SYSTEM AND METHOD FOR CHANNEL STATE FEEDBACK IN CARRIER AGGREGATION

(75) Inventors: Mark Earnshaw, Kanata (CA); Mo-Han Fong, Ottawa (CA); Zhijun Cai, Irving, TX (US); Hua Xu, Kanata (CA); Youn Hyoung Heo, Waterloo (CA)

(73) Assignee: BlackBerry Limited, Waterloo, Ontario (CA)

( * ) Notice: Subject to any disclaimer, the term of this patent is extended or adjusted under 35 U.S.C. 154(b) by 755 days.

(21) Appl. No.: 12/771,084

(22) Filed: Apr. 30, 2010

(65) Prior Publication Data

US 2011/0269490 A1 Nov. 3, 2011

(51) Int. Cl.
*H04B 1/66* (2006.01)
(52) U.S. Cl.
USPC .......................................................... 375/240
(58) Field of Classification Search
USPC .................. 370/464, 465, 468; 709/223, 226; 700/90, 95, 97, 99; 375/240, 240.01, 375/240.02, 240.07
See application file for complete search history.

(56) References Cited

U.S. PATENT DOCUMENTS

| 8,457,091 | B2 * | 6/2013 | Pani et al. ...................... 370/342 |
| 2002/0080902 | A1 * | 6/2002 | Kim et al. ...................... 375/377 |
| 2007/0076583 | A1 * | 4/2007 | Hadad ............................ 370/203 |
| 2007/0286127 | A1 * | 12/2007 | Inohiza .......................... 370/331 |
| 2008/0144561 | A1 * | 6/2008 | Kaikkonen et al. ........... 370/315 |
| 2011/0142144 | A1 * | 6/2011 | Allpress et al. ............... 375/259 |
| 2011/0261774 | A1 * | 10/2011 | Lunttila et al. ................ 370/329 |
| 2011/0268032 | A1 * | 11/2011 | Kim et al. ...................... 370/328 |
| 2011/0319113 | A1 * | 12/2011 | Takeda et al. ................. 455/509 |
| 2012/0008489 | A1 * | 1/2012 | Higuchi et al. ............... 370/203 |

OTHER PUBLICATIONS

International Search Report and Written Opinion of the International Searching Authority issued in International Application No. PCT/US2011/034166 on Nov. 15, 2012; 13 pages.
Ericsson, ST-Ericsson; 3GPP TSG RAN WG1 Meeting #60 (R1-101293); "HS-DPCCH Design for 4C-HSDPA"; San Francisco, California; Feb. 22-26, 2010; 6 pages.
Ericsson, ST-Ericsson; 3GPP TSG RAN WG1 Meeting #60bis (R1-101794); "HS-DPCCH for 4C-HSDPA"; Beijing, China; Apr. 12-16, 2010; 12 pages.
Huawei; 3GPP TSG RAN WG2 Meeting #68bis (R2-100161; "Consideration on CQI Feedback Cycle in Combined DC-HSDPA and MIMO"; Valencia, Spain; Jan. 18-22, 2010; 5 pages.
Nokia Siemens Networks, Nokia; 3GPP TSG RAN WG1 Meeting #62 (R1-104435); "Periodic CSI Reporting for Carrier Aggregation"; Madrid, Spain; Aug. 23-27, 2010; 2 pages.
Pantech; 3GPP TSG-RAN WG1 #64 (R1-110750); "On CSI Ambiguity Handling with Activation/Deactivation"; Taipei, Taiwan; Feb. 21-25, 2011; 2 pages.
International Search Report and Written Opinion of the International Searching Authority issued in Interanational Application No. PCT/US2011/034166 on Aug. 31, 2011; 15 pages.

* cited by examiner

*Primary Examiner* — Fan Ng
(74) *Attorney, Agent, or Firm* — Fish & Richardson P.C.

(57) ABSTRACT

A method for communicating channel state information (CSI) to a base station is presented. The method includes identifying a number of allocated resources for CSI within at least one of a Physical Uplink Control CHannel (PUCCH) payload and a Physical Uplink Shared CHannel (PUSCH) payload. The method includes encoding channel state information (CSI) for activated carriers on a user equipment into the allocated resources for CSI. When a number of activated carriers on the user equipment is less than the number of allocated resources for CSI, the method includes using repetition encoding to duplicate the CSI for at least one of the activated carriers on the user equipment into the allocated resources for CSI.

12 Claims, 12 Drawing Sheets

SYSTEM AND METHOD FOR CHANNEL STATE FEEDBACK IN CARRIER AGGREGATION

BACKGROUND

The present invention relates generally to data transmission in communication systems and, more specifically, to methods and systems for channel state feedback in networks and devices implementing carrier aggregation.

As used herein, the terms "user equipment" and "UE" can refer to wireless devices such as mobile telephones, personal digital assistants (PDAs), handheld or laptop computers, and similar devices or other User Agents ("UA") that have telecommunications capabilities. In some embodiments, a UE may refer to a mobile, wireless device. The term "UE" may also refer to devices that have similar capabilities but that are not generally transportable, such as desktop computers, set-top boxes, or network nodes.

In traditional wireless telecommunications systems, transmission equipment in a base station or other network node transmits signals throughout a geographical region known as a cell. As technology has evolved, more advanced equipment has been introduced that can provide services that were not possible previously. This advanced equipment might include, for example, an evolved universal terrestrial radio access network (E-UTRAN) node B (eNB) rather than a base station or other systems and devices that are more highly evolved than the equivalent equipment in a traditional wireless telecommunications system. Such advanced or next generation equipment may be referred to herein as long-term evolution (LTE) equipment, and a packet-based network that uses such equipment can be referred to as an evolved packet system (EPS). Additional improvements to LTE systems and equipment result in an LTE advanced (LTE-A) system. As used herein, the phrase "base station" will refer to any component or network node, such as a traditional base station or an LTE or LTE-A base station (including eNBs), that can provide a UE with access to other components in a telecommunications system.

In mobile communication systems such as E-UTRAN, a base station provides radio access to one or more UEs. The base station comprises a packet scheduler for dynamically scheduling downlink traffic data packet transmissions and allocating uplink traffic data packet transmission resources among all the UEs communicating with the base station. The functions of the scheduler include, among others, dividing the available air interface capacity between UEs, deciding the transport channel to be used for each UE's packet data transmissions, and monitoring packet allocation and system load. The scheduler dynamically allocates resources for Physical Downlink Shared CHannel (PDSCH) and Physical Uplink Shared CHannel (PUSCH) data transmissions, and sends scheduling information to the UEs through a control channel.

To facilitate communications, a plurality of different communication channels are established between a base station and a UE including, among other channels, a Physical Downlink Control Channel (PDCCH). As the label implies, the PDCCH is a channel that allows the base station to control a UE during downlink data communications. To this end, the PDCCH is used to transmit scheduling assignment or control data packets referred to as Downlink Control Information (DCI) packets to a UE to indicate scheduling to be used by the UE to receive downlink communication traffic packets on a Physical Downlink Shared Channel (PDSCH) or transmit uplink communication traffic packets on a Physical Uplink Shared Channel (PUSCH) or specific instructions to the UE (e.g., power control commands, an order to perform a random access procedure, or a semi-persistent scheduling activation or deactivation). A separate DCI packet may be transmitted by the base station to a UE for each traffic packet/sub-frame transmission.

It is generally desirable to provide high data rate coverage using signals that have a high Signal to Interference Plus Noise ratio (SINR) for UEs serviced by a base station. Typically, only those UEs that are physically close to a base station can operate with a very high data rate. Also, to provide high data rate coverage over a large geographical area at a satisfactory SINR, a large number of base stations are generally required. As the cost of implementing such a system can be prohibitive, research is being conducted on alternative techniques to provide wide area, high data rate service.

In some cases, carrier aggregation can be used to support wider transmission bandwidths and increase the potential peak data rate for communications between a UE, base station and/or other network components. In carrier aggregation, multiple component carriers are aggregated and may be allocated in a sub-frame to a UE as shown in FIG. 1. FIG. 1 shows carrier aggregation in a communications network where each component carrier has a bandwidth of 20 MHz and the total system bandwidth is 100 MHz. As illustrated, the available bandwidth 100 is split into a plurality of carriers 102. In this configuration, a UE may receive or transmit on multiple component carriers (up to a total of five carriers 102 in the example shown in FIG. 1), depending on the UE's capabilities. In some cases, depending on the network deployment, carrier aggregation may occur with carriers 102 located in the same band and/or carriers 102 located in different bands. For example, one carrier 102 may be located at 2 GHz and a second aggregated carrier 102 may be located at 800 MHz.

In network communications, information describing the state of one or more of the carriers or communication channels established between a UE and a base station can be used to assist a base station in efficiently allocating the most effective resources to a UE. Generally, this channel state information (CSI) includes measured CSI at a UE and can be communicated to the base station within uplink control information (UCI). In some cases, in addition to the CSI, UCI may also contain Hybrid Automatic Repeat reQuest (HARQ) acknowledgment/negative acknowledgement (ACK/NACK) information in response to PDSCH transmissions on the downlink. HARQ ACK/NACK transmissions are used to signal successful receipt of data transmissions and to request retransmissions of data that was not received successfully. Depending upon the system implementation, the CSI may include combinations of one or more of the following as channel quality information: Channel Quality Indicator (CQI), Rank Indication (RI), and/or Precoding Matrix Indicator (PMI). For LTE-A (Rel-10), depending upon the system implementation, there may be more channel quality information types in addition to the formats listed above.

The CSI provides information about the observed channel quality on a downlink carrier observed by the UE. The base station then uses the CSI to assist with downlink scheduling and other applications. For example, the CQI may assist the base station with selecting an appropriate modulation and coding scheme (MCS). The RI provides an indication as to whether the UE can support one or multiple spatial multiplexing layers, and the PMI provides information about the preferred multi-antenna precoding for downlink transmissions.

Depending upon the uplink transmission resources available at a particular point in time, the UE may transmit the CSI information within UCI either on a Physical Uplink Control CHannel (PUCCH) resource or multiplexed into a PUSCH (Physical Uplink Shared CHannel) allocation.

A PUCCH format 2/2a/2b (see, for example, TS 36.211, "3rd Generation Partnership Project; Technical Specification Group Radio Access Network; Evolved Universal Terrestrial Radio Access (E-UTRA); Physical channels and modulation (Release 8)". http://www.3gpp.org/ftp/Specs/html-info/36211.htm) may be used for CSI transmission in Rel-8 if no PUSCH allocation is scheduled. This PUCCH format can carry 20 coded bits corresponding to a maximum information bit payload of about 11 CSI bits, and the CSI payload may be block-encoded as described in section 5.2.3 of TS 36.212, "3rd Generation Partnership Project; Technical Specification Group Radio Access Network; Evolved Universal Terrestrial Radio Access (E-UTRA); Multiplexing and channel coding (Release 8)". http://www.3gpp.org/ftp/Specs/html-info/36212.htm.

If a PUSCH allocation is available, the CSI information may be first encoded and then multiplexed with an uplink shared channel (UL-SCH) transport block as described in sections 5.2.2.6 and 5.2.2.7 of TS 36.212, "3rd Generation Partnership Project; Technical Specification Group Radio Access Network; Evolved Universal Terrestrial Radio Access (E-UTRA); Multiplexing and channel coding (Release 8)". http://www.3gpp.org/ftp/Specs/html-info/36212.htm, respectively. If no UL-SCH transport block is present, then the CSI information may be encoded to fill the PUSCH allocation as described in section 5.2.4 of TS 36.212, "3rd Generation Partnership Project; Technical Specification Group Radio Access Network; Evolved Universal Terrestrial Radio Access (E-UTRA); Multiplexing and channel coding (Release 8)". http://www.3gpp.org/ftp/Specs/html-info/36212.htm.

For reference, section 8.6.2 of TS 36.213, "3rd Generation Partnership Project; Technical Specification Group Radio Access Network; Evolved Universal Terrestrial Radio Access (E-UTRA); Physical layer procedures (Release 8)". http://www.3gpp.org/ftp/Specs/html-info/36213.htm describes how a base station can provide a PUSCH grant and signal to the UE that the PUSCH allocation is to be used only for control information feedback (i.e. no UL-SCH transport block is to be included).

While a UE is communicating with a base station, uplink carriers and downlink carriers may be activated or deactivated depending upon the resource allocations made by the base station to the UE. Generally, carrier activation and deactivation can be accomplished through either explicit or implicit activation or deactivation. Explicit activation of configured downlink carriers may be performed using media access control (MAC) signaling through, for example, a MAC control element (CE). Similarly, explicit deactivation of configured downlink carriers can be performed using MAC signaling (e.g., using a MAC control element). Implicit deactivation of configured downlink carriers may be performed using a timer associated with each activated downlink carrier. In that case, the timer for a particular carrier is reset whenever any activity (i.e. a transmission or a retransmission) occurred on that carrier. If the timer expired through a lack of activity, the corresponding downlink carrier may then be implicitly deactivated by the UE.

In a multi-carrier network implementation providing the functionality described above (e.g., allowing for explicit or implicit deactivation of carriers), there are several important considerations. A UE may be assigned certain uplink resources for reporting CSI information about the currently activated downlink carriers. In that case, it is important to ensure that those resources are efficiently used for transmitting CSI from a potentially variable number of downlink carriers. Furthermore, it is important that a UE be capable of indicating to a base station which (and possibly how much) CSI information (i.e. for which downlink carriers) is included in a particular control feedback transmission.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
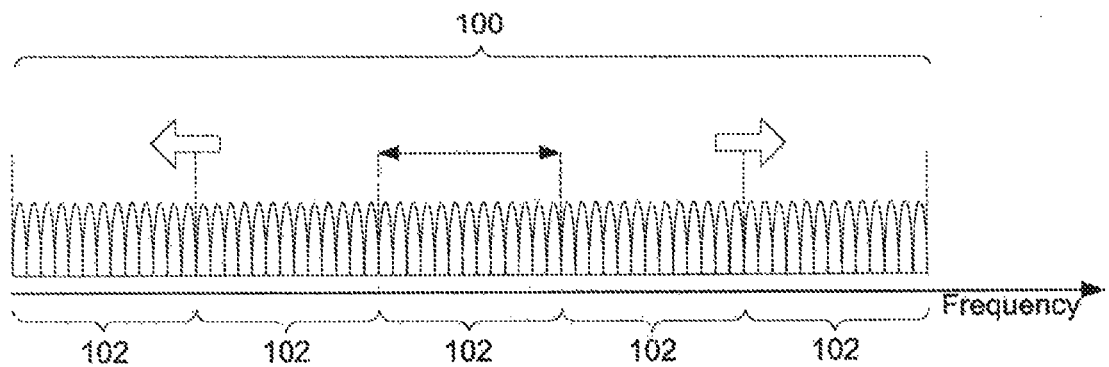
FIG. 1 shows carrier aggregation in a communications network where each component carrier has a bandwidth of 20 MHz and the total system bandwidth is 100 MHz.

The present invention relates generally to data transmission in communication systems and more specifically to methods and systems for channel state feedback in networks and devices implementing carrier aggregation.

Some embodiments include a method for communicating channel state information (CSI) to a base station. The method includes identifying a number of allocated resources for CSI within at least one of a Physical Uplink Control CHannel (PUCCH) payload and a Physical Uplink Shared CHannel (PUSCH) payload, and encoding channel state information (CSI) for activated carriers on a user equipment into the allocated resources for CSI. The method includes, when a number of activated carriers on the user equipment is less than the number of allocated resources for CSI, using repetition encoding to duplicate the CSI for at least one of the activated carriers on the user equipment into the allocated resources for CSI.

Other embodiments include a method for communicating channel state information (CSI) to a base station. The method includes identifying a number of allocated resources for CSI within at least one of a Physical Uplink Control CHannel (PUCCH) payload and a Physical Uplink Shared CHannel (PUSCH) payload. The allocated resources have a total allocated bit size. The method includes encoding channel state information (CSI) for each of a number of activated carriers on the user equipment into the allocated resources for CSI using an encoding rate. When the number of activated carriers on the user equipment is less than the number of allocated resources for CSI, the encoding rate is selected so that a total bit size of the encoded CSI for the number of activated carriers on the user equipment is the same as the allocated bit size.

Other embodiments include a method for receiving channel state information (CSI) from a user equipment. The method includes receiving at least one of a Physical Uplink Control CHannel (PUCCH) payload and a Physical Uplink Shared CHannel (PUSCH) payload from the user equipment. The at least one of a PUCCH payload and a PUSCH payload includes a number of allocated resources for channel state information (CSI). When the number of allocated resources for CSI include duplicated CSI, the method includes determining that the user equipment has activated a number of carriers less than the number of allocated resources for CSI.

Other embodiments include a method for receiving channel state information (CSI) from a user equipment. The method includes receiving at least one of a Physical Uplink Control CHannel (PUCCH) payload and a Physical Uplink Shared CHannel (PUSCH) payload from the user equipment. The at least one of a PUCCH payload and a PUSCH payload includes a number of allocated resources for channel state information (CSI). The method includes determining an encoding rate of CSI information encoded in the allocated resources, and using the encoding rate to determine a number of activated carriers on the user equipment.

Other embodiments include a user equipment including a processor configured to identify a number of allocated resources for CSI within at least one of a Physical Uplink Control CHannel (PUCCH) payload and a Physical Uplink Shared CHannel (PUSCH) payload, and encode channel state information (CSI) for activated carriers on a user equipment into the allocated resources for CSI. The processor is configured to, when a number of activated carriers on the user equipment is less than the number of allocated resources for CSI, use repetition encoding to duplicate the CSI for at least one of the activated carriers on the user equipment into the allocated resources for CSI.

Other embodiments include a user equipment including a processor configured to identify a number of allocated resources for CSI within at least one of a Physical Uplink Control CHannel (PUCCH) payload and a Physical Uplink Shared CHannel (PUSCH) payload. The allocated resources have a total allocated bit size. The processor is configured to encode channel state information (CSI) for each of a number of activated carriers on the user equipment into the allocated resources for CSI using an encoding rate. When the number of activated carriers on the user equipment is less than the number of allocated resources for CSI, the encoding rate is selected so that a total bit size of the encoded CSI for the number of activated carriers on the user equipment is the same as the allocated bit size.

To the accomplishment of the foregoing and related ends, the invention, then, comprises the features hereinafter fully described. The following description and the annexed drawings set forth in detail certain illustrative aspects of the invention. However, these aspects are indicative of but a few of the various ways in which the principles of the invention can be employed. Other aspects and novel features of the invention will become apparent from the following detailed description of the invention when considered in conjunction with the drawings.

The various aspects of the subject invention are now described with reference to the annexed drawings, wherein like numerals refer to like or corresponding elements throughout. It should be understood, however, that the drawings and detailed description relating thereto are not intended to limit the claimed subject matter to the particular form disclosed. Rather, the intention is to cover all modifications, equivalents, and alternatives falling within the spirit and scope of the claimed subject matter.

As used herein, the terms "component," "system" and the like are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a computer and the computer can be a component. One or more components may reside within a process and/or thread of execution and a component may be localized on one computer and/or distributed between two or more computers.

The word "exemplary" is used herein to mean serving as an example, instance, or illustration. Any aspect or design described herein as "exemplary" is not necessarily to be construed as preferred or advantageous over other aspects or designs.

Furthermore, the disclosed subject matter may be implemented as a system, method, apparatus, or article of manufacture using standard programming and/or engineering techniques to produce software, firmware, hardware, or any combination thereof to control a computer or processor based device to implement aspects detailed herein. The term "article of manufacture" (or alternatively, "computer program product") as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the claimed subject matter.

A multi-carrier capable UE may be configured with a number of available downlink carriers. The configured downlink carriers, however, are not used by the UE unless they have been activated by the base station. In one example network implementation, up to five downlink carriers can be simultaneously activated. As such, at any particular time, there may be between one and five downlink carriers that are activated.

In many networks, carrier activation can be achieved using MAC signaling. Before a carrier can be activated, however, it must be configured. Generally, carrier configuration takes longer than carrier activation as it is performed using radio resource control (RRC) signaling rather than MAC signaling (RRC signaling is less efficient and may introduce greater latency than MAC signaling but on the other hand the RRC signaling may provide better reliability). As a result, RRC signaling is generally performed on a semi-static basis and is not used as often as MAC signaling, which is instead used for carrier activation or deactivation. Also, because MAC signaling typically carries a small amount of signaling information, the assignment of uplink resources (e.g. PUCCH resources) for control information feedback may be implemented as part of the carrier configuration procedure. Consequently, the assignment of uplink resources may also be performed on a less frequent basis than carrier activation or deactivation.

Because the assignment of resources takes longer than the activation or deactivation of already-assigned resources, to operate efficiently a base station assigns a UE sufficient uplink resources to handle control information feedback for the maximum number of downlink carriers that were expected to be activated for that UE.

When carrier aggregation is enabled for a UE, the UE may transmit CSI values to the base station for each of the activated downlink carriers. The CSI allows the base station to select appropriate MCS levels, rank, precoding matrix, etc, for scheduled transmissions on each downlink carrier.

In some cases, following the activation or deactivation of a carrier, the UE and the base station may become desynchronized. When desynchronized, the UE may transmit CSI for carriers that the base station believes to be deactivated on the UE, or the UE may fail to transmit CSI for carriers that the base station believes to be activated on the UE. CSI desynchronization between the UE and the base station may occur following either a carrier activation or deactivation.

For example, after a carrier activation message is transmitted to a UE, if the UE fails to successfully receive the activation message and responds with a negative-acknowledgement (NACK) message (resulting in the carrier not being activated at the UE), the NACK message may be incorrectly received by the base station as an acknowledgement (ACK). In that case, the base station believes the UE to have activated a resource that the UE has, in fact, failed to activate. Accordingly, there is a possibility of a NACK-to-ACK error on the uplink from UE to base station.

In one example of this error, the UE attempts to decode a PDSCH transport block containing a carrier activation MAC CE, but the decoding fails. After the decoding fails, the UE signals a DL HARQ NACK on the uplink to the base station, but the base station mistakenly interprets the received NACK as a received ACK. As a result, the base station believes that the carrier was successfully activated. But the UE has not activated the carrier—the decoding failed. Consequently, because the carrier was not activated, the UE would not transmit CSI reports for this newly "activated" (from the viewpoint of the base station) carrier, but the base station would be expecting to receive these CSI reports.

In circumstances where a configured downlink carrier is deactivated via MAC signaling (i.e., using a MAC CE) there is again a possibility of a NACK-to-ACK error on uplink communications from the UE to the base station. In that case, after failing to decode the carrier deactivation signaling, the UE transmits a NACK to the base station which is incorrectly received by the base station as an ACK. In that case, the base station would believe that the carrier identified in the MAC deactivation signaling message was successfully deactivated by the UE, but the UE would not actually have deactivated the carrier as it failed to receive and process the deactivation message. Consequently, the UE would continue to transmit CSI reports for the carrier that the base station believes has been deactivated, but that, in fact, the UE is continuing to use.

In some cases, a downlink carrier may be deactivated if no transmissions have been received on that carrier for a particular length of time (i.e. a timer expires causing the UE to deactivate the carrier). In that case, there is a risk that the UE may incorrectly allow the timer to expire by failing to successfully decode messages for that carrier causing the carrier to be deactivated on the UE, but the base station believes the carrier to be still active. As an example, if a UE incorrectly detects one or more PDCCH transmissions corresponding to a particular downlink carrier, the UE may believe that the UE has received no transmissions for that carrier and may, incorrectly, allow the timer to expire. This would result in the UE deactivating a downlink carrier that the base station may consider to still be active.

Alternatively, the UE may falsely detect a downlink communication on a particular carrier (for example, the UE interprets that the PDCCH is designated to the UE due to a false positive on the cyclic redundancy check (CRC) but actually the PDCCH is either designated for another UE or the CRC results in a completely false decoding positive). In that case, the UE will restart its carrier deactivation timer and, as a result, the timer at the UE will expire at a later time than the timer at the base station. As a result, the UE will mistakenly consider that the carrier is still active while the base station considers the carrier to be deactivated.

Consequently, there are several problems associated with the activation and deactivation of carriers and the subsequent communication of CSI for those carriers. At a first time, both the base station and UE may presume that M downlink carriers have been activated. But due to a missed activation by the UE, the base station believes that M+m downlink carriers have been activated (where m represents the number of downlink carriers that were simultaneously activated), while the UE continues to believe that only M downlink carriers are activated. Alternatively, due to an incorrect implicit deactivation by the UE, as described above, the base station may believe that M downlink carriers are activated, while the UE believes that less than M downlink carriers have been activated. In another example, both the base station and UE presume that N downlink carriers have been activated. But due to a missed deactivation (either explicit or implicit) by the UE, the base station then believes that N−n downlink carriers have been activated (where n represents the number of downlink carriers that were simultaneously deactivated), while the UE continues to believe that N downlink carriers are activated.

In any of the above situations where a downlink carrier desynchronization occurs between the UE and base station, one or more of the following problems may arise. The base station may associate a received CSI value with the wrong downlink carrier. The base station may incorrectly decode encoded and multiplexed CSI values and thus obtain an incorrect CSI value for one or more downlink carriers. If the CSI value for a particular downlink carrier is incorrect, then the base station may select an inappropriate MCS, rank, and/or precoding matrix combination when scheduling downlink transmissions to the UE on the corresponding carrier. If, for example, the selected MCS is too low, then downlink transmission resources may be wasted as the selected MCS could be overly conservative. If the selected MCS is too high, then the resulting HARQ retransmission rate will be high, which may introduce additional latency and may also result in inefficient use of downlink transmission resources.

The present system allows for a more robust reporting of CSI related to a variable number of downlink carriers where existing network implementations may create uncertainty regarding the number and configuration of downlink carriers used by a UE.

When control information (e.g. CSI) is fed back to the base station by the UE, the base station expects the information to be encoded within a certain predefined payload size (e.g., a predefined bit size). The predefined size allows the base station to properly decode the encoded information. The amount of received CSI information will change, however, when a downlink carrier is activated (i.e., more total CSI information will need to be fed back to the base station) or deactivated (i.e. less total CSI information will need to be fed back to the base station), as described above. If, however, the overall payload size for CSI changes and it is not known to the base station, the base station may be unable to decode the CSI.

In the present system, therefore, if multi-carrier CSI is jointly encoded together and the number of carriers associated with CSI reporting changes (causing a change in the amount of CSI fed back to the base station by the UE), a repetition coding can be used within the information bits to maintain the same overall payload length regardless of the number of activated carriers. Accordingly, in the present system, if two carriers are currently activated and then one of the carriers is deactivated, the UE switches from reporting a joint payload of CSI1+CSI2 (i.e., the CSI information for the first and second carrier) to a payload of CSI1+CSI1, duplicating the CSI for the first carrier (i.e., the CSI information for the first carrier is duplicated). In both cases, the total payload length is the same, and, thus, the base station can correctly recover the encoded information from either transmission. Alternatively, an opposite approach can be used (i.e., switching from a payload of CSI1+CSI1 to a payload of CSI1+CSI2) when a new carrier is activated and the UE begins CSI reporting for the newly activated carrier.

The present system can be used in network implementations where the CSI feedback for two carriers is multiplexed into the same PUCCH transmission, for example. The approach is also equally applicable to a CSI transmission being made via the PUSCH (in the present description, the term "PUCCH" is interchangeable with "PUSCH").

In the present system, for example, when the CSI information for two downlink carriers is multiplexed into a common PUCCH resource, the base station and the UE agree upon which bits of the information payload correspond to which CSI information. For example, the total payload size could consist of 8 information bits and two allocated resources for CSI, with the first 4 information bits representing the CQI value for a first carrier, and the second 4 information bits representing the CQI value for a second carrier. Alternatively, the total payload size could consist of 10 information bits and two allocated resources for CSI, with bits 1-4 representing the CQI value for the first carrier, bit 5 representing the RI (Rank Indicator) for the first carrier, bits 6-9 representing the CQI value for the second carrier, and bit 10 representing the RI for the second carrier. Other CSI field multiplexings are also possible, and could be configured via RRC signaling.

Figure 2:
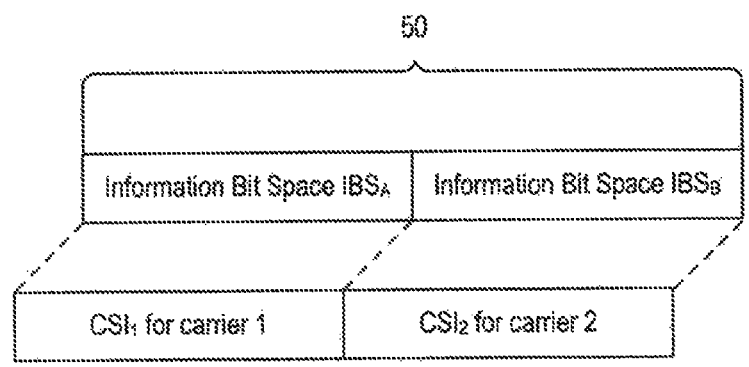
FIG. 2 is an illustration of a PUCCH information bit payload including a first information bit space $IBS_A$ and a second information bit space $IBS_B$.

As an example, FIG. 2 is an illustration of a PUCCH information bit payload 50 including a first information bit space $IBS_A$ and a second information bit space $IBS_B$. Each of $IBS_A$ and $IBS_B$ are resources that may be allocated for storing CSI for a carrier. In this example, FIG. 2 illustrates the carrier configuration at a first time when both the base station and the UE are each accurately aware that two downlink carriers have been activated. When performing CSI feedback for the two activated carriers, the UE can place the channel state information (CSI) for the two carriers into the two available information bit spaces. As shown in FIG. 2, CSI for carrier 1 (CSI1) has been placed into information bit space $IBS_A$, while CSI for carrier 2 (CSI2) has been placed into information bit space $IBS_B$.

Figure 3:
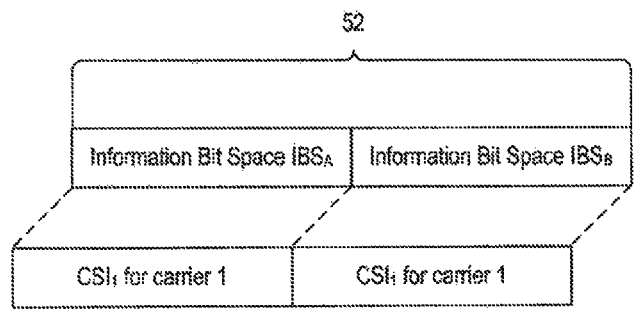
FIG. 3 is an illustration of a CSI to PUCCH information bit space mapping when one of two activated carriers is deactivated.

If, for example, carrier 2 is then deactivated by the base station, and both the base station and UE successfully deactivate this carrier, the CSI to PUCCH information bit space mapping for the same PUCCH resource could then be performed as shown in FIG. 3. FIG. 3 is an illustration of a CSI to PUCCH information bit space mapping 52 when one of two activated carriers is deactivated. As shown in FIG. 3, as only carrier 1 is activated (carrier 2 having been successfully deactivated), a copy of CSI1 (the CSI for carrier 1) can be mapped to each of the two available information bit spaces, $IBS_A$ and $IBS_B$. This is a simple form of repetition coding prior to forward error correction (FEC) coding that would allow the base station to use PUCCH power control signaling to reduce the UE's PUCCH transmission power while still maintaining the same level of reliability. It would also be possible for a UE to reduce the uplink transmit power autonomously if CSI1 is repeated in this manner.

The present CSI encoding method illustrated in FIGS. 2 and 3 can provide protection to circumstances when a UE misses a carrier deactivation command from the base station (e.g. due to a NACK-to-ACK error). In that situation, the UE would continue transmitting CSI1 and CSI2 (as shown in FIG. 2), while the base station would instead be expecting only two copies of CSI1 (as shown in FIG. 3). But because the size and partitioning of the information bit payload and the coding rate of the PUCCH information have not changed, the original payload bits can still be recovered by the base station.

Accordingly, using this method, when the base station issues a carrier deactivation command, the base station can continue to decode the CSI values carried in the two information bit spaces ($IBS_A$ and $IBS_B$) separately for some period of time to ensure that both information bit spaces are always carrying the same CSI value (i.e. CSI1). This would aid in confirming that the UE had properly received the carrier deactivation command and has stopped sending CSI for the deactivated carrier. Conversely, if the base station determines that $IBS_A$ and $IBS_B$ appear to be carrying different CSI values (i.e. CSI1 and CSI2), then the base station may determine that the UE had not correctly received the carrier deactivation command and is continuing to use carrier 2 (and is continuing to report CSI for that carrier). In that case, the base station could reissue the deactivation command to the UE. Alternatively, the UE may include padding bits in $IBS_B$.

The present method provides similar benefits for carrier activation. That is, when only a single carrier is currently activated (but two resources are allocated for CSI of two carriers), the UE could transmit two copies of CSI1 in the configured PUCCH resource (as shown in FIG. 3). After a carrier activation command is successfully received by the UE, the UE could then transmit both CSI1 and CSI2 (for the recently activated carrier) as shown in FIG. 2. Again, this approach guards against the situation where the UE misses the carrier activation command from the base station (e.g. due to a NACK-to-ACK error). If the UE fails to successfully receive the carrier activation, the base station would still be able to correctly decode the CSI values, which will contain a duplicated CSI value for carrier 1. Because the CSI values can still be accurately decoded, the base station is able to use these CSI values while determining that the UE missed the carrier activation command from other observations (e.g. no HARQ ACK/NACKs in response to transmissions on the newly-activated downlink carrier), and then the base station can reissue the carrier activation command to the UE. The base station may also detect that the UE missed a carrier activation command by comparing the two CSI values included in the transmission from the UE. If the values are the same over a certain period of time, then the base station may determine that the UE may have missed the carrier activation command and is only sending duplicated CSI values for the first carrier.

This method may also be used when more than two downlink carriers have been activated for a UE by applying one or more of Frequency Division Multiplexing (FDM), Time Division Multiplexing (TDM), or Code Division Multiplexing (CDM). For example, if two carriers are activated for the UE, then one Rel-8 PUCCH resource space can be used if it is possible to multiplex all of the control information from the two carriers into that single PUCCH (e.g. PUCCH format 2).

If, however, three or four carriers are activated for the UE, then two Rel-8 PUCCH resource spaces (e.g. two PUCCH format 2s) can be used where the CSI for each carrier is mapped to the resource space in sequential order of carrier index. For example, carriers 1 and 2 could be mapped into the first PUCCH resource, and carrier 3 and carrier 4 could be mapped into the second PUCCH resource. One or more of FDM, TDM, or CDM could then be used to coordinate the two PUCCH resources. The PUCCH resource space can be preconfigured via RRC signaling or can be dynamically signaled in the MAC CE used for activation/deactivation.

Alternatively, a new PUCCH format with a larger information bit payload could be used to multiplex CSI information from more than two carriers into one PUCCH resource.

Additional signaling bits may be included in the control information feedback transmission to identify the actually transmitted content. If the total payload size remains constant, then the additional signaling bits could be included within the payload. For example, the payload may always include CSI for two carriers, and the additional signaling can be used to identify the two carriers for which CSI are being reported. In some cases, the additional signaling bits may be encoded separately, and the base station would first decode those signaling bits to determine the actual length of the associated payload so that the information payload can be properly decoded.

Accordingly, one or more signaling bits can be included as part of the UCI's information bit payload to provide further information about the CSI information included in the accompanying payload. After receiving the transmission from the UE, the base station can then perform different hypothesis testing during the decoding process based on different values of the signaling bits and corresponding CSI content in the information bit space. As above, this solution is applicable to CSI information being transmitted using either the PUCCH or PUSCH, although the PUCCH is used as an example in the present discussion.

Figure 4:
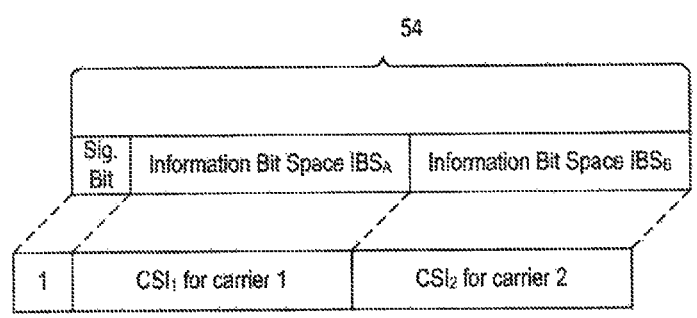
FIG. 4 is an illustration of a PUCCH information bit payload including a signaling bit that indicates CSI for two different carriers.
Figure 5:
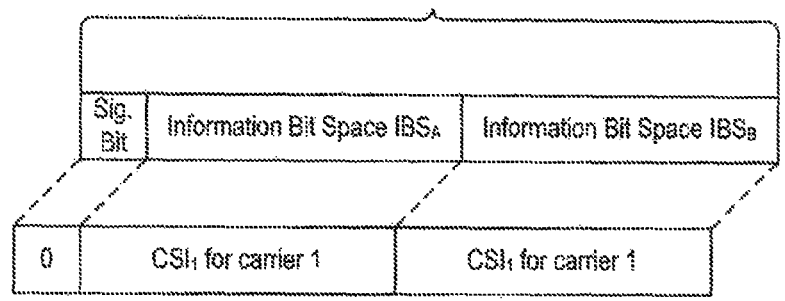
FIG. 5 is an illustration of a PUCCH information bit payload including a signaling bit that indicates duplicated CSI for the same carrier.

In one particular implementation where two sets of CSI are encoded within a single transmission, a single extra bit can be used to indicate whether the two sets of CSI are for different downlink carriers or for the same downlink carrier. For example, a signaling bit value of 1 could indicate that the two CSIs are for different carriers. As an example of this, FIG. 4 is an illustration of a PUCCH information bit payload 54 including a signaling bit (labeled as 'sig. bit' on FIG. 4) having a value of 1 that indicates CSI for two different carriers. Conversely, a signaling bit value of 0 could indicate that the two CSIs are for the same carrier. As an example of this, FIG. 5 is an illustration of a PUCCH information bit payload 56 including a signaling bit (labeled as 'sig. bit' on FIG. 5) that indicates duplicated CSI for the same carrier. This implementation allows a base station to efficiently detect the number of carriers being monitored by a UE. Accordingly, the base station can use the bit to confirm that a carrier deactivation or activation command has been correctly received by the UE.

In another implementation, additional signaling bits are used to indicate exactly which downlink carriers have CSI information included in the uplink transmissions. In that case, the additional signaling bits may comprise a bitmap, where, for example, a value of 0 indicates that CSI information for the corresponding carrier was not included, while a value of 1 would indicate that CSI information for the corresponding carrier was included. Accordingly, in a PUCCH configured to carry CSI for two carriers at a time, the UE could signal exactly which two carriers have CSI included within a PUCCH transmission.

Figure 6:
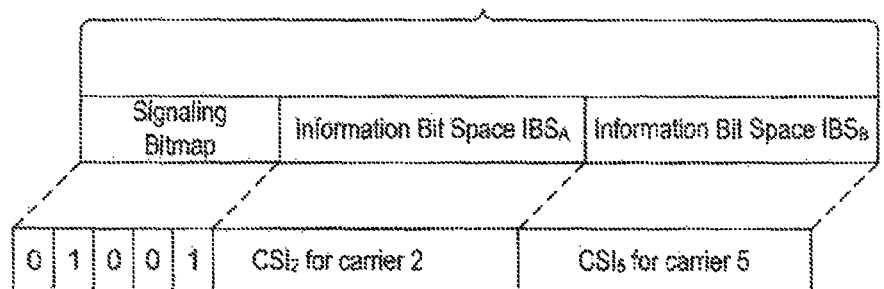
FIG. 6 is an illustration of a PUCCH information bit payload including a signaling bitmap to indicate for which carriers CSI feedback is included.

FIG. 6 is an illustration of a PUCCH information bit payload 58 including a signaling bitmap to indicate for which carriers CSI feedback is included. In FIG. 6, for example, five carriers have been activated on the UE, and CSI information for carriers 2 and 5 are included within the illustrated PUCCH transmission. The signaling bitmap has a length of 5 and the position of each bit within the bitmap is mapped to the carrier number. In this example, the bitmap has values of 1 at the second and fifth location within the bitmap indicating that the transmission includes CSI for carriers 2 and 5. As multiple CSI values are included within the payload, they can be arranged in a predetermined order (e.g. in ascending order of carrier index) so that the base station can correctly associate each CSI value with the corresponding carrier.

If the payload is configured to carry two CSI values, but the UE only wishes to transmit one, then the UE could set only one bit of the bitmap portion of the payload rather than two. When the base station sees that only one carrier is indicated as having a CSI value present, then the base station can assume that both of the included CSI values belong to the same carrier and are therefore identical. If, however, the bitmap is encoded separately from the information bit payload, then the base station would be able to first decode the bitmap value and then determine the appropriate length of the information bit payload for decoding purposes based on the number and/or indices of the CSI-reporting carriers indicated by the bitmap.

This implementation may still be used when CSI having different data lengths are transmitted for different downlink carriers as the single bitmap can still be used to identify the carriers associated with the CSI. This holds when different downlink carriers are configured to use different transmission modes. This implementation may also support CSI values for more than two carriers to be multiplexed into one PUCCH because the bitmap indicates to which carriers the CSI values correspond. The bitmap information sent by the UE can also be used by the base station to validate that the UE has successfully received the carrier activation/deactivation command (i.e. MAC CE signaling) to activate and/or de-activate one or more carriers at the same time. For example, if the UE misses a carrier activation, then the base station will note from the CSI bitmap that no CSI information is being received for the newly activated carrier(s). Similarly, if the UE misses a carrier deactivation, then the base station will note from the CSI bitmap that CSI information is still being reported for the newly deactivated carrier(s).

Following a carrier deactivation (or activation), after a predefined period of time which could be controlled by a timer, both the UE and the base station may be configured to switch to a new CSI reporting format in a time-synchronized manner. The delay period could be used to allow sufficient time for the UE to transmit an acknowledgement that the UE had received (and acted upon) the carrier deactivation/activation command and/or for the base station to determine that the UE had in fact missed the carrier deactivation/activation command. Accordingly, the present system may be configured with a built-in delay to allow the base station and UE to confirm that the UE has activated or deactivated the correct carriers.

In this implementation, following the successful (from the viewpoint of the base station) reception of a downlink carrier activation or deactivation command at the UE, after a predetermined period of time both the base station and UE undertake a synchronized reconfiguration of the CSI information to be transmitted to the base station by the UE (e.g., after certain subframes). In some cases, the base station and UE also undertake a synchronized reconfiguration of the PUCCH resource/format for CSI transmissions.

Figure 7:
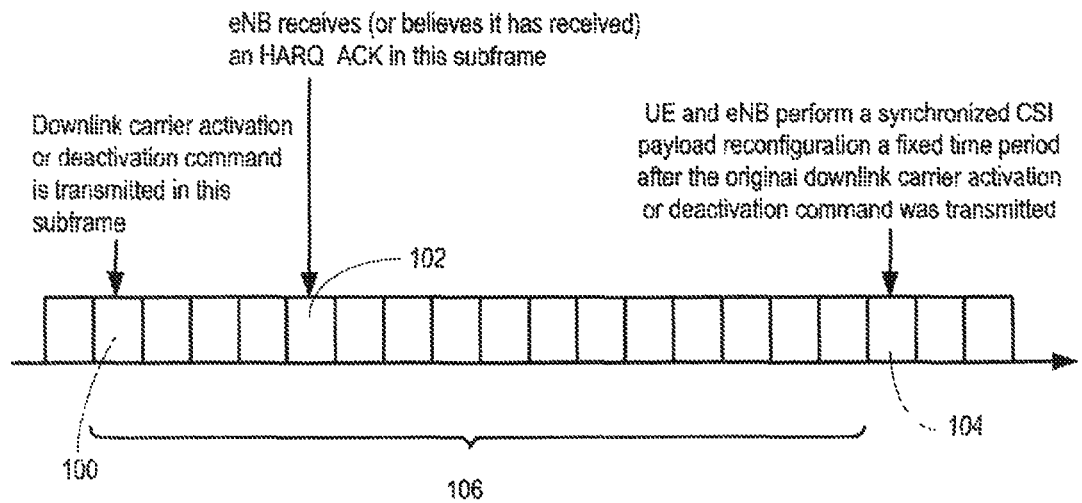
FIG. 7 is an illustration of a base station and UE implementing synchronized CSI reconfiguration after a predetermined period of time.

FIG. 7 is an illustration of a base station and UE implementing synchronized CSI reconfiguration after a predetermined period of time. In FIG. 7, the base station attempts to activate or deactivate a carrier by transmitting a DL-SCH transport block to a UE. The transport block contains the carrier activation or deactivation MAC control element and is transmitted at a first subframe 100. In response, the UE transmits a HARQ ACK or NACK four subframes later in subframe 102 to indicate whether the transport block was successfully received and processed.

If the base station detects a HARQ NACK, the base station will retransmit the transport block. If, however, the base station detects a HARQ ACK in subframe 102, the base station will presume that the carrier identified in the transport block was successfully activated or deactivated by the UE in accordance with the instructions contained within the transport block. There are, however, two circumstances in which the base state could detect a HARQ ACK received from the UE. First, if the UE did in fact transmit a HARQ ACK. Second, the base station may incorrectly receive a HARQ NACK from the UE as a HARQ ACK and believe the transport block was successfully received by the UE (i.e. a NACK-to-ACK error).

Referring to FIG. 7, sometime after the base station believes it received a HARQ ACK from the UE, the base station and UE can be configured to perform a CSI payload reconfiguration to ensure that the CSI configuration of both entities is synchronized. The CSI payload reconfiguration allows the base station and UE to synchronize which CSI values are to be included in particular CSI transmissions. The synchronization is performed a predefined time after the successful transmission of the original carrier activation or deactivation MAC control element (i.e. at subframe 104). In this example, a time delay of 16 subframes 106 is used before CSI payload reconfiguration, although any predefined or configured time delay could be used.

When performing CSI payload reconfiguration after a pre-determined time period (or pre-determined number of subframes), two different system circumstances may arise. First, the UE may correctly decode the original DL-SCH transport block (e.g., the transport transmitted in subframe 100) containing the carrier activation/deactivation MAC control element and signal a HARQ ACK in response that is successfully received by the base station. In that case, both the UE and the base station perform a synchronized CSI payload and/or PUCCH resource/format reconfiguration at subframe 104.

Second, the UE may be unable to decode the DL-SCH transport block containing the carrier activation/deactivation MAC control element. The UE will then signal a HARQ NACK back to the base station. The base station, however, may incorrectly receive the HARQ NACK as a HARQ ACK due to a NACK-to-ACK error. In the present implementation, after a NACK-to-ACK error at the base station, the base station has until subframe 104 to determine that the UE has not actually received the carrier activation/deactivation command and can then abort the CSI payload reconfiguration to prevent the UE and base station CSI reporting from becoming desynchronized.

The UE may be configured to transmit an uplink MAC control element that acknowledges the carrier activation or deactivation command. The acknowledgement may include signaling bits that are inserted into the PUCCH information payload as described above. Alternatively, the acknowledgement may consist of echoing back the same MAC control element contents to the base station using the uplink as were provided on the downlink. This acknowledgement can be paired with a previous activation/deactivation command by matching the carrier activation/deactivation bit map values in the MAC control elements. The acknowledgement may indicate which MAC CE has been received where the MAC CE used for carrier activation/deactivation is identified by a sequence number. The time window before the synchronized CSI payload reconfiguration can be sufficiently long to allow for the uplink transmission (and possible HARQ retransmission) of this acknowledgement. In the present system, if the base station does not receive a carrier activation/deactivation acknowledgement, then the base station may determine that the UE did not correctly receive the carrier activation/deactivation and can therefore abort the CSI payload reconfiguration procedure.

Alternatively, instead of defining a fixed time period or number of subframes for when the CSI-reporting reconfiguration shall occur, the base station may signal the UE to perform reconfiguration explicitly. The signaling may be limited to occur only after the base station has determined that the UE successfully received the carrier activation/deactivation command.

When CSI and other control information are reported for multiple carriers, the total information bit payload size may be larger than in Rel-8. Consequently, a relatively short (e.g., 8 bit) CRC may be appended to the information payload prior to encoding. The CRC may allow the base station to use blind decoding to correctly recover an encoded payload where the actual payload length may be unknown (or may correspond to one of a set of several possible payload lengths). This can be useful in the following situations. First, the UE may miss a carrier deactivation command and thus report more CSI values than the base station anticipates (in that case, payload length would be longer than expected). Second, the UE may miss a carrier activation command and report fewer CSI values than the base station expects (payload length would be shorter than expected). Third, the UE may autonomously decide which CSI values are to be included in a particular CSI report and thus the payload length may vary. Accordingly, there may be several circumstances where a UE may wish to signal a variable amount of CSI information to the base station or, alternatively, the base station needs to be able to recognize that the UE has transmitted a different CSI payload length than the base station was expecting.

If, for example, the observed CSI value for a downlink carrier changes significantly, the UE may wish to quickly update the base station with this information. Alternatively, the CSI payload length may vary due to a missed carrier activation or deactivation command (e.g. due to an HARQ NACK-to-ACK error at the base station).

Accordingly, in the present system, the information payload length of the PUCCH is configured to contain variable payload size. Different coding rates can be applied to the encoding of the information payload. If the encoded payload with CRC is transmitted in a PUSCH resource or PUCCH resource, the base station can then use blind decoding to determine the exact payload length that was transmitted.

Figure 8:
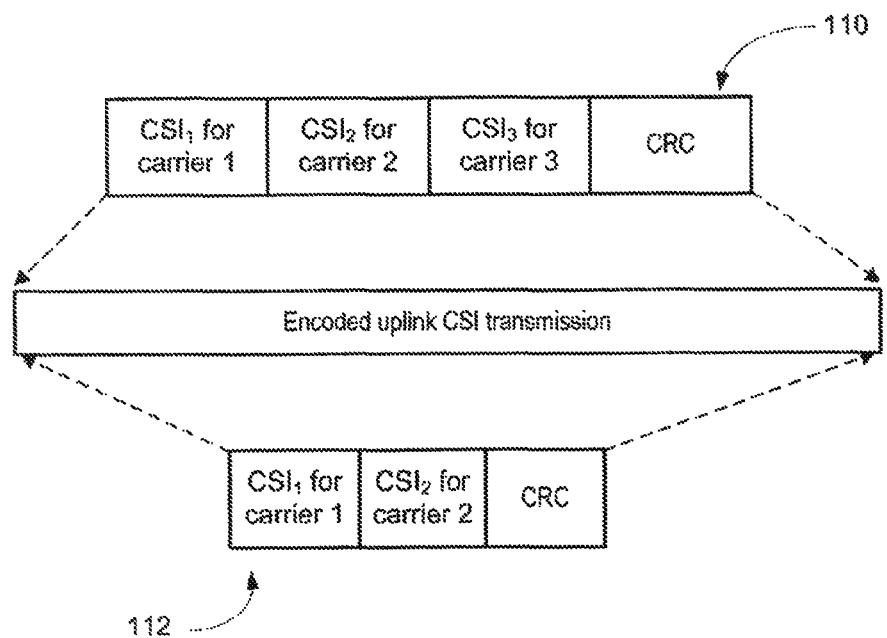
FIG. 8 is an illustration of a variable rate coding scheme for encoding different CSI payload lengths into the same number of uplink transmission resources.

FIG. 8 is an illustration of a variable rate coding scheme for encoding different CSI payload lengths into the same number of uplink transmission resources. In FIG. 8, two example payloads (e.g., 110 and 112) of different lengths are encoded to fit within the same uplink transmission resources. In the example, payload 110 includes CSI for three carriers in addition to the corresponding CRC. Payload 112, however, only includes CSI for two carriers with corresponding CRC. Accordingly, payload 112 includes less data than payload 110, but can be encoded using a variable rate coding scheme, so that both payloads 110 and 112 consume the same number of uplink resource bits. Both payloads 110 and 112 each use a different coding rate and rate matching to yield the same number of encoded bits for over-the-air transmission. Accordingly, when transmitting CSI for three carriers, the UE may use the configuration illustrated by payload 110. If transmitting CSI for only two carriers, the UE can use the configuration illustrated by payload 112.

The payload lengths and corresponding coding rates that can be supported for an allocated PUCCH resource can be preconfigured by the base station via RRC signaling, for example, from the base station to the UE.

In this implementation, to assist the base station in determining the true payload size, a short (e.g. 8-bit) CRC value can be appended to the information bit payload prior to encoding. Using the CRC, the base station can then perform blind decoding on different possible values of the information bit payload, calculate the received CRC on the hypothesized decoded information bits, and compare this received CRC to the transmitted CRC included in the transmitted data. If the transmitted and received CRC match, then the blind decoding was successful and the base station can identify the number of carriers for which CSI was transmitted and then retrieve the encoded CSI for each carrier. As such, the UE can transmit an amount of data that vary from the amount expected by the base station, but the base station is still able to correctly decode the transmitted information.

Accordingly, for example, the base station may first presume the transmission contains CSI for only a single carrier. On that assumption, the base station attempts decoding. If the decoding is successful, the base station knows that CSI for only a single carrier was included. If decoding fails, however, the base station attempts decoding on the assumption that CSI for two carriers was included. If that decoding is successful, the base station knows that CSI for two carriers was included. If the decoding was unsuccessful, however, the base station moves onto an assumption of CSI for three carriers, and so on.

In this manner, the base station can detect when a UE has failed to receive a carrier activation or deactivation. For example, after a UE is originally configured with three active carriers, the base station may transmit a carrier deactivation message to the UE. The UE may, however, fail to successfully receive the carrier deactivation message, but the corresponding HARQ-NACK message may be received by the base station as a HARQ-ACK (e.g., a NACK-to-ACK error at the base station). In that case, the base station may believe the UE deactivated the identified carrier when, in fact, the UE did not. Accordingly, the base station anticipates receipt of CSI information formatted as in payload 112 of FIG. 8 (only including CSI for the remaining two carriers), but the UE actually sends CSI information formatted as payload 110 (including CSI for all three carriers at a different encoding rate). In that case, the base station will fail to decode the payload when assuming the payload is encoded as in payload 112, but will successfully decode the transmission when attempting to decode using the encoding of payload 110. In that case, the base station can accurately determine that the UE failed to deactivate the indicated carrier and still has at least three active carriers. Even so, the base station has successfully received CSI for the carriers. The base station may then attempt to re-send the original deactivation message to deactivate the third of the UE's carriers.

In some implementations, a CRC can be used to provide additional protection for CSI transmissions from a UE. A short (e.g. 8-bit) CRC generally provides less robust protection than a longer CRC (e.g. 24 bits). With an 8-bit CRC, for example, an incorrect set of payload bits is more likely to result in a false match between the transmitted and received CRCs. Even so, it should be noted that the UE would generally be transmitting a CSI information bit payload of a length equal to that expected by the base station except in a small minority of cases, so a false CRC match should occur rarely. Circumstances where the UE will transmit an unexpected payload length include when the UE misses a carrier activation or deactivation due to a HARQ NACK-to-ACK error, or the UE wishes to include additional or unexpected CSI information in a CSI report (e.g. due to the observed channel conditions on a particular downlink carrier changing rapidly).

If the base station decodes the expected payload length and the CRCs do not match, then the base station may blind decode other possible payload lengths to determine the information actually sent by the UE.

In some implementations, the signaling bit solutions described above may be included in the CSI payload to identify to the base station the included CSI information (e.g. for which downlink carriers CSI is transmitted).

Finally, in this implementation, if the UE continues to transmit CSI information for a downlink carrier that the base station believes to be deactivated, the base station can quickly detect this condition using blind decoding as the blind decoding will show that the UE's transmission includes CSI for the believed-to-be deactivated carrier. The base station may then retransmit the original deactivation command that was not received by the UE. Similarly, the base station can detect a condition where the UE missed a carrier activation command (e.g. due to a HARQ NACK-to-ACK error) as the blind decoding will indicate a lack of CSI for the believed-to-be activated carrier. In that case, the base station may then retransmit the activation command.

Additional control signaling may also be established and included within the carrier activation/deactivation MAC control element, for example, to identify which preconfigured reporting resources (e.g. PUCCH or PUSCH, etc) the UE should use. Accordingly, in addition to simply including information about the carriers to be activated and/or deactivated, a MAC control element could also be configured to contain additional signaling describing which feedback reporting format and/or reporting resources a UE should use. The additional signaling could be either an index of the predefined configurations or the actual configurations, for example.

The signaling may also provide some additional protection against circumstances where a UE may miss a carrier activation or deactivation command. If, for example, the additional signaling is used to change the reporting resources, but the UE continues to use the old reporting resources, then the base station may conclude that the UE missed the carrier activation/deactivation command. Conversely, if the UE switches to the new reporting resources, then the base station may conclude that the UE correctly received the carrier activation/deactivation command.

In one example of this implementation, RRC signaling is first used to configure the UE with N possible PUCCH (or PUSCH) resource spaces. After the resources are configured, MAC signaling (e.g. a carrier activation/deactivation command) can then indicate which of the N resource spaces is to be used. This form of signaling may require $Log_2(N)$ bits to signal one of N resource spaces. The UE could then map the CSI for each carrier to the currently allocated resource space in sequential order of carrier index.

In some network implementations a bitmap may be included within the MAC control element to indicate which carriers are to be activated and which should be deactivated. Depending upon the exact format of the bitmap, there may be additional spare bits available within the MAC control element, which is constrained to have a length corresponding to an integral number of bytes. For example, if a maximum of five carriers can be configured, a bitmap of length five bits would be required, leaving three spare bits that could be used to signal which resource space to use for uplink control information feedback.

In that case, the preconfigured PUCCH resource spaces may be linked or associated to the number of activated carriers using the three signaling bits. For example, the base station may preconfigure the UE with N=8 PUCCH resource spaces. If only one carrier is activated, the base station can signal which one of those eight PUCCH resources the UE should use for control information reporting using the three signaling bits.

In another example, four carriers may be activated and the UE needs to use two of the available PUCCH resources for reporting purposes. In that case, the base station can preconfigure eight possible pairs among the PUCCH resources, and then use the MAC control element to signal which of those eight pairs the UE should use for reporting. For example, eight possible PUCCH pairs (using a base set of eight PUCCH resources could be identified within a lookup table as follows: {(1,2) (3,4) (5,6) (7,8) (1,5) (2,6) (3,7) (4,8)}. In that case, a single one of the 8 possible PUCCH pairs can be specifically identified using the three signaling bits (e.g., by referring to a position of the PUCCH pair within the lookup table). Accordingly, the PUCCH pair 1,2 can be referred by its position within the lookup table (e.g., 0). Similarly, the PUCCH pair 3,7 can be referred to by its position within the lookup table (e.g., 6)

The PUCCH format to be used could also be preconfigured via RRC signaling or could be implicitly derived based on the number of CSI values being multiplexed (i.e. the number of activated carriers).

Sometimes periodic PUSCH resources are granted for uplink control feedback transmissions in a similar manner as the existing functionality of semi-persistent scheduling (SPS). The allocation of periodic resources can be useful as it is generally undesirable to dynamically schedule PUSCH resources specifically for control feedback transmissions due to the resulting signaling overhead on the PDCCH. As such, in the present system, the MAC control element may be configured to include signaling information instructing the UE to switch between preconfigured PUCCH resources and preconfigured PUSCH resources for reporting CSI. Alternatively, the switchover could be implicit based upon the number of currently activated downlink carriers.

Accordingly, using the present implementation, if the amount of CSI data that needs to be fed back to the base station is too large to be contained within a PUCCH, the base station may assign a small number of periodic PUSCH resources to the UE, and the UE could then use those resources to transmit all of the required control information. The periodic PUSCH resources could be configured as part of the carrier aggregation RRC configuration message that is sent to the UE. After configuration, each configured carrier may be assigned a separate periodic PUSCH resource. In some cases, a periodic PUSCH resource may be assigned to carry the CSI information of multiple configured carriers.

As an example, UCI data for three configured carriers could be mapped to one assigned periodic PUSCH resource. To allow different total payload sizes to be carried in this periodic PUSCH resource for different numbers of activated carriers (i.e. one to three), the various implementations of the present system described above can be used. It may also be possible to link these assigned PUSCH resources to SPS such that SPS activations and/or deactivations may also be used to quickly enable or disable CSI reporting via the PUSCH. Alternatively, a carrier activation or deactivation MAC control element may either explicitly or implicitly enable or disable the UE's use of these periodic PUSCH resources that corresponds to the carriers that are activated or deactivated. Such an operation may be desirable, for example, during periods of low or no traffic, where the base station wishes to deactivate a number of the configured downlink carriers and instruct the UE to provide CSI feedback for the remaining downlink carrier using a preconfigured PUCCH resource instead.

Alternatively, the UE could use the preassigned PUSCH resources for CSI reporting only when the number of activated downlink carriers is larger than or equal to a certain value (e.g. 3). If the number of activated downlink carriers drops below this value, then the UE could suspend its use of the CSI PUSCH resources and report CSI values on the PUCCH (unless a dynamically-scheduled PUSCH resource is available).

If periodic PUSCH resources are allocated for CSI reporting, then it may be desirable to perform these CSI transmissions on the PUSCH using the current SPS transmission power allocation as described in Section 5.1.1.1 of TS 36.213, "3rd Generation Partnership Project; Technical Specification Group Radio Access Network; Evolved Universal Terrestrial Radio Access (E-UTRA); Physical layer procedures (Release 8)". http://www.3gpp.org/ftp/Specs/html-info/36213.htm, rather than the power allocation for a dynamically-scheduled PUSCH transmission to ensure successful delivery.

In some network implementations, CSI reports and HARQ ACK/NACKs may be transmitted together as part of the same set of feedback control information. Because the transmission timing of periodic CSI transmissions can be semi-statically configured and HARQ ACK/NACK transmission occurs when PDSCH transmissions are scheduled, the two items (CSI and HARQ ACK/NACK) are sometimes simultaneously transmitted in the same subframe.

As discussed above, to transmit CSI information for multiple downlink carriers, various modified or new PUCCH formats can be used. However, because HARQ ACK/NACK and periodic CSI transmissions may occur simultaneously, it is important to consider the ramifications of multiplexing CSI and HARQ ACK/NACK together. Sometimes, HARQ ACK/NACK messages are transmitted next to the demodulation reference signal (DM-RS) symbols within a subframe by puncturing coded symbols of UL-SCH data and/or CSI information, possibly resulting in an increase in the actual coding rate of the other transmissions due to the puncturing. In Release-8, the number of HARQ ACK/NACK bits is relatively small and the punctured UL-SCH data can be recovered, if necessary, by HARQ retransmission. In LTE-A, however, this may present a problem as the maximum number of HARQ ACK/NACK bits may be relatively large (i.e. up to 12 HARQ ACK/NACK bits) and the retransmission of CSI information may not be supported.

Accordingly, in one implementation of the present system, the CSI coding rate is adjusted in relation to the number of coded symbols to be allocated for HARQ ACK/NACKs. As the number of coded symbols allocated for HARQ ACK/NACKs increases, the CSI coding rate is increased since fewer modulation symbols are then available for the CSI transmission. In that case, to maintain the same level of reliability of CSI transmissions, the transmit power of the PUCCH may be increased. The base station can instruct the UE to increase the transmit power using transmit power control (TPC). Alternatively, the UE can increase its transmit power autonomously using a preconfigured offset when HARQ ACK/NACK is multiplexed with CSI in CSI-only PUSCH. The offset can be variable with respect to the amount of puncturing, or the number of transmitted HARQ ACK/NACK. Alternatively, the offset could be configured to have a value of zero by the base station such that additional uplink interference does not result. In all cases, the UE cannot increase its transmit power above the maximum possible transmission power that has been configured either for the UE (i.e. the power class of the UE) or by the base station (i.e. the maximum allowable transmission power for a cell).

Alternatively, to minimize the puncturing loss resulting from the multiplexing of CSI and HARQ ACK/NACK data, the number of information bits allocated for CSI may be reduced. In this implementation, when HARQ ACK/NACK is multiplexed with CSI in a CSI-only PUSCH resource, the UE is configured to reduce the amount of CSI information communicated, to maintain the reliability of remaining CSI information after puncturing by the HARQ ACK/NACK data. The amount of reduction can be explicitly signaled by higher layer signalling/L1/L2 signaling, for example, or implicitly determined based on the number of HARQ ACK/NACKs being multiplexed.

Alternatively, the present system may be configured to implement separate coding per carrier or CSI type. In that case, the coded symbols of CSI for certain carrier may be punctured by a HARQ ACK/NACK transmission to transmit the remaining non-punctured CSIs without degradation due to puncturing. In this implementation, to transmit HARQ ACK/NACK within a feedback transmission next to the DM-RS included within the transmission, the location of CSI within the transmission can be arranged such that only one CSI is punctured by the HARQ ACK/NACK while the remaining CSI are transmitted without puncturing. The punctured CSIs are located in HARQ ACK/NACK symbols and the other CSIs are located in the remaining symbols. Alternatively, HARQ ACK/NACK is transmitted in the location of the punctured CSIs.

Figure 9A:
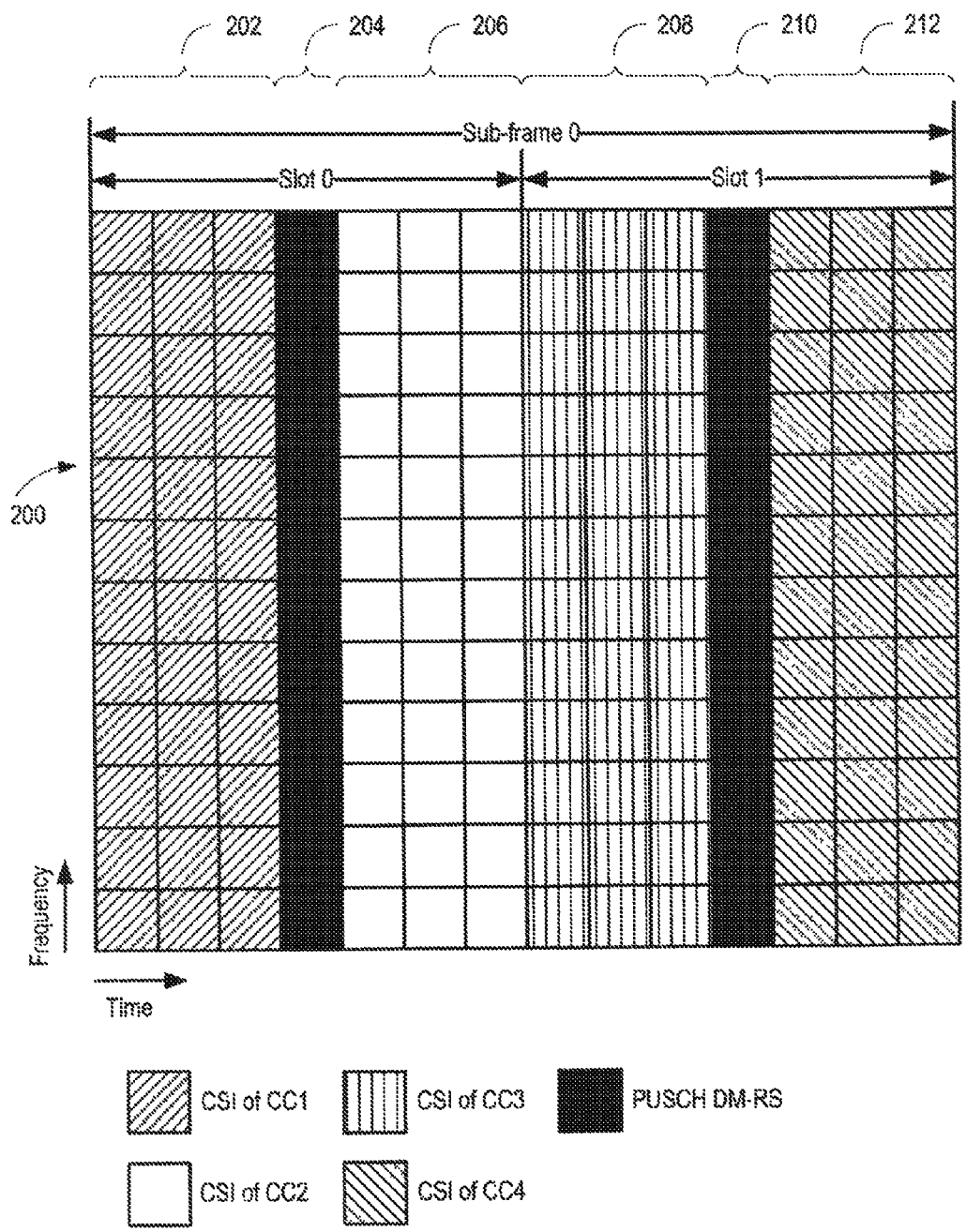
FIGS. 9a and 9b are illustrations showing a first and second subframe, with the subframe in FIG. 9a including CSI for 4 carriers, and the subframe in FIG. 9b including a puncturing HARQ ACK/NACK transmission.
Figure 9B:
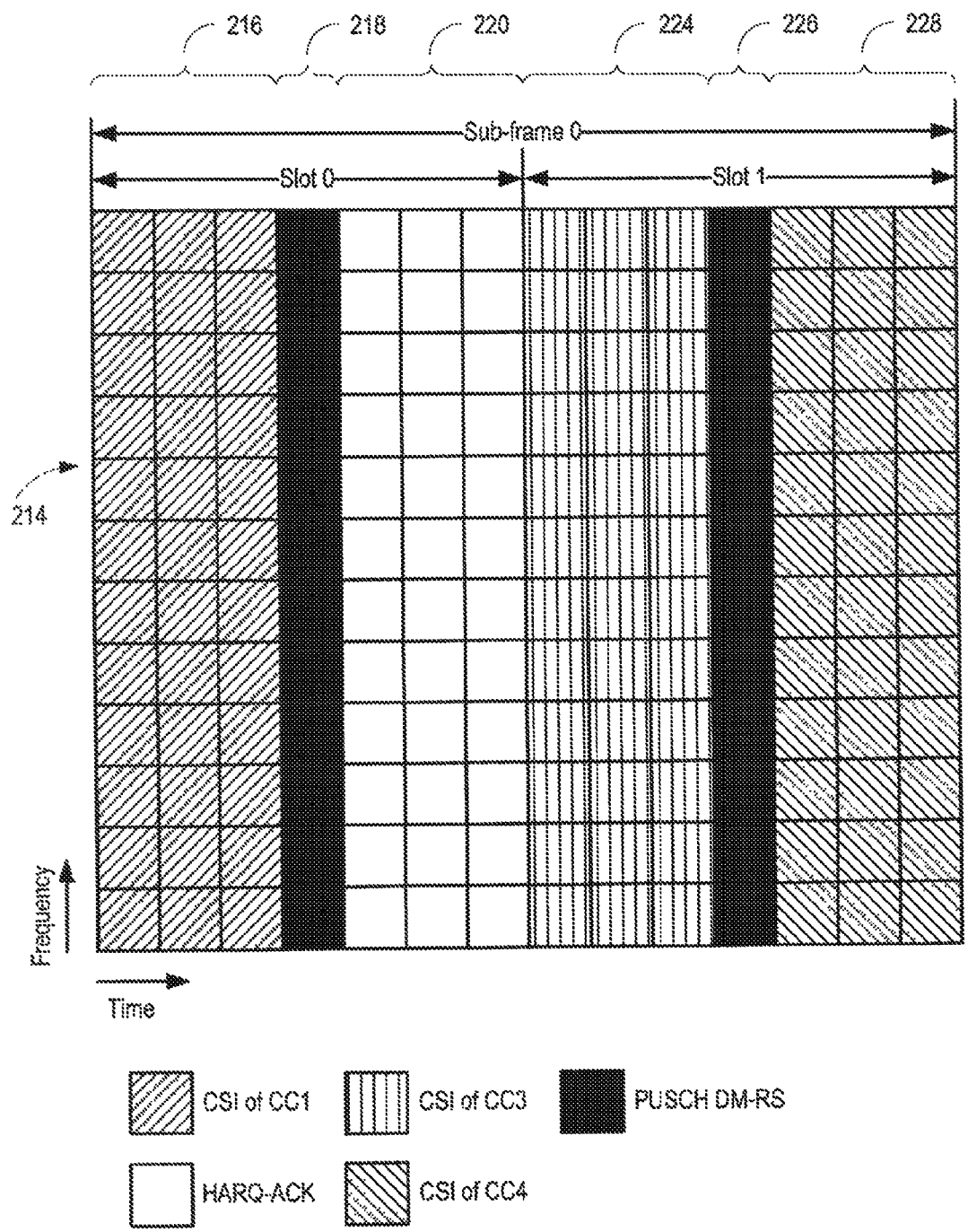

For example, FIGS. 9a and 9b are illustrations showing a first and second subframe, with the subframe in FIG. 9a including CSI for 4 carriers, and the subframe in FIG. 9b including a puncturing HARQ ACK/NACK transmission. FIG. 9a shows subframe 200 including two slots (slot 0 and slot 1). Within subframe 200, CSI information is encoded for a first carrier 202, second carrier 206, third carrier 208 and fourth carrier 212. Each slot of subframe 200 includes a PUSCH DM-RS 204 and 210. FIG. 9b shows subframe 214 including two slots (slot 0 and slot 1). Within subframe 214, CSI information is encoded for a first carrier 216, third carrier 224 and fourth carrier 228. Subframe 214 includes HARQ ACK/NACK data 220 that punctures regions of the subframe that may ordinarily be used to convey CSI information for the second carrier and part of fourth carrier. Each slot of subframe 214 includes a PUSCH DM-RS 218 and 226.

When CSI for a carrier (e.g., carrier 2 of FIG. 9b) is punctured with HARQ ACK/NACK data, the base station is aware of which CSI was punctured in the subframe for a particular control feedback transmission and can then compensate for that information loss. For example, the particular CSI to be transmitted could be a function of the current SFN (System Frame Number), where the pattern would cycle through the activated carriers in turn. Alternatively, the UE may dynamically signal the CSI ordering to the base station. For example, if N CSI values are being signaled at the same time, the UE could indicate that the CSI value for carrier m occurs in the first position, with the CSI values for the remaining carriers proceeding in order and wrapping around when the $N^{th}$ carrier is reached (i.e. $CSI_m, CSI_{m+1}, \ldots, CSI_N, CSI_1, \ldots, CSI_{m-1}$). By knowing the first carrier in the CSI list, the carriers corresponding to the remaining CSI values can then be determined. By making the value m a function of the current time (e.g. the current SFN), then the UE would not need to signal the index of the first carrier in the list since this would be implicitly known at the base station. If the CSI information has been excessively punctured, then the base station may be forced to reuse the previously-reported CSI information for the corresponding carrier or make estimates of the CSI based upon data reported from other UEs. The CSI information for different carriers may be punctured at successive reporting instances by rotating the identity of the punctured carrier amongst the available activated carriers (e.g., in a first transmission CSI of carrier 1 is punctured, in a second transmission CSI of carrier 2 is punctured, etc.). After each carrier has been punctured, the rotation returns to the first carrier and repeats. Accordingly, if the puncturing is evenly distributed amongst carriers, any particular carrier may not be affected more than the other carriers.

In some implementations, the time interval between successive CSI reports could be reduced to compensate for the CSI information that is lost due to the puncturing, thereby increasing the frequency of CSI reporting by the UE. The base station may also request that the UE make an aperiodic CSI report by setting the CQI request flag of DCI 0 when an uplink grant is made. This approach may be used, for example, if the base station determines that the CSI information stored by the base station requires updating, particular if the CSI information was recently punctured by HARQ ACK/NACK data.

Alternatively, the CSI and HARQ ACK/NACK may be transmitted within a subframe using CDM (e.g., using a different Walsh cover). For example, the Walsh cover of CSI transmission can be different depending on the presence of HARQ ACK/NACKs. In one implementation, a Walsh cover with length-2 can be used for CSI transmissions in cases when HARQ ACK/NACK is not transmitted. Conversely, a Walsh cover with length-4 can be used in cases when CSI transmission is multiplexed with HARQ ACK/NACK data. That is, CSI and HARQ ACK/NACK data may be spread and multiplexed using different Walsh codes with length-4. The larger length code can be generated based from the short length code in order to keep the orthogonality with other PUCCHs. Alternatively, a Walsh cover with the same length can be used for CSI transmission regardless of the existence of HARQ ACK/NACKs. In that case, however, it might result in inefficient resource utilization when HARQ ACK/NACKs are not transmitted.

The various implementations of the present system described above allow for the use of assigned uplink resources (PUCCH and/or PUSCH) for the feedback of downlink carrier CSI information in an efficient manner regardless of the number of downlink carriers that are currently activated. In the present system, methods such as including additional signaling bits to indicate which CSI reports are included in a particular feedback transmission, variable rate coding based on the number of reported carriers, and adjusting the UE transmission power based on the payload size and effective coding rate may each be used to provide for the improved system operation.

The implementations described above may also handle the potential problem of a carrier desynchronization (i.e. the UE and base station have a mismatch in their activated downlink carrier sets (e.g. due to a NACK-to-ACK error or a missed carrier activation command, etc)) at the UE and base station in a robust manner by allowing the base station (e.g., eNB) to correctly decode and obtain transmitted CSI information in such a carrier desynchronization situation.

Figure 10A:
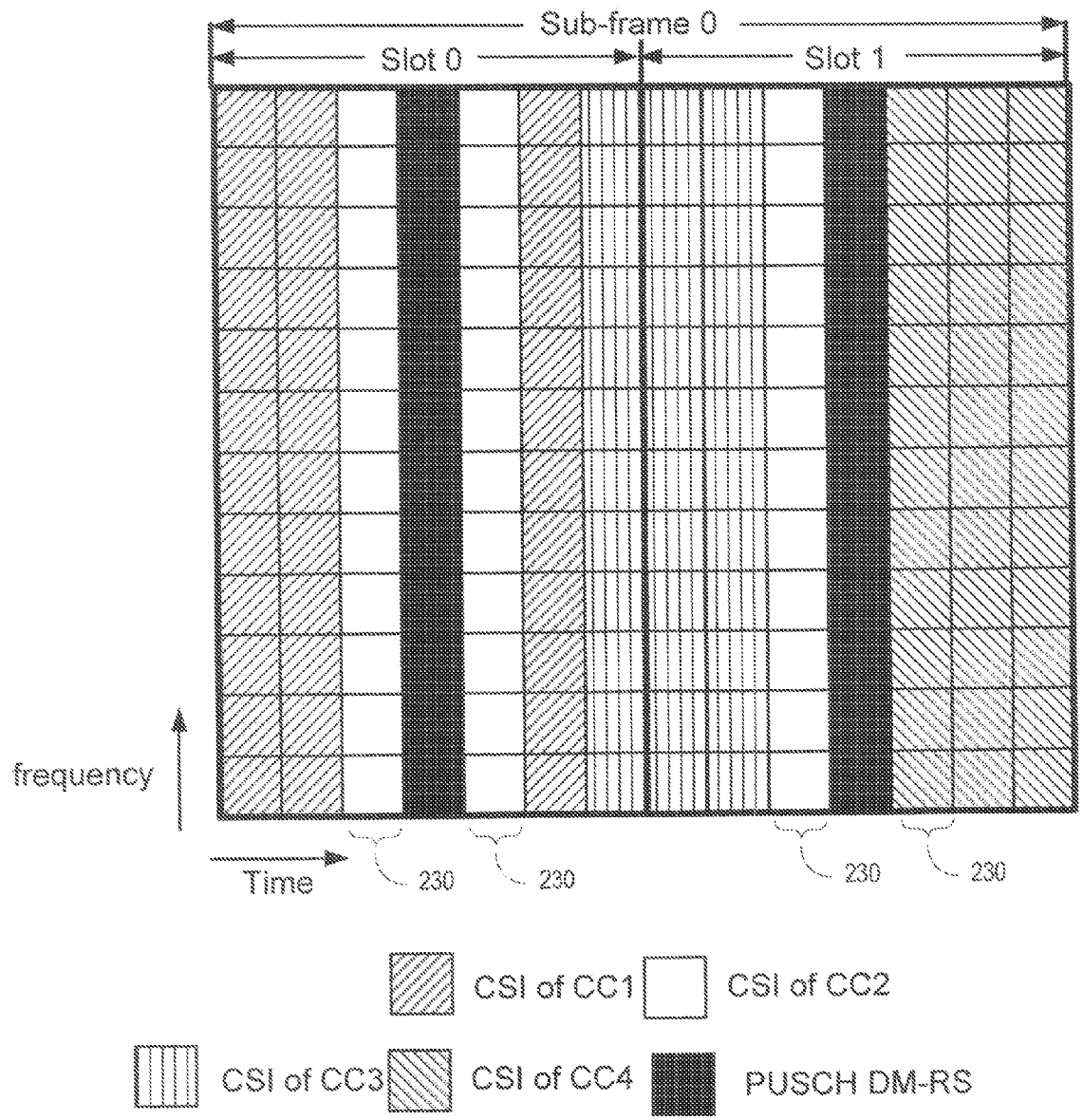
FIGS. 10a and 10b are illustrations of example subframes showing an alternative encoding of HARQ ACK/NACK information proximate to one or more reference symbols (RS)
Figure 10B:
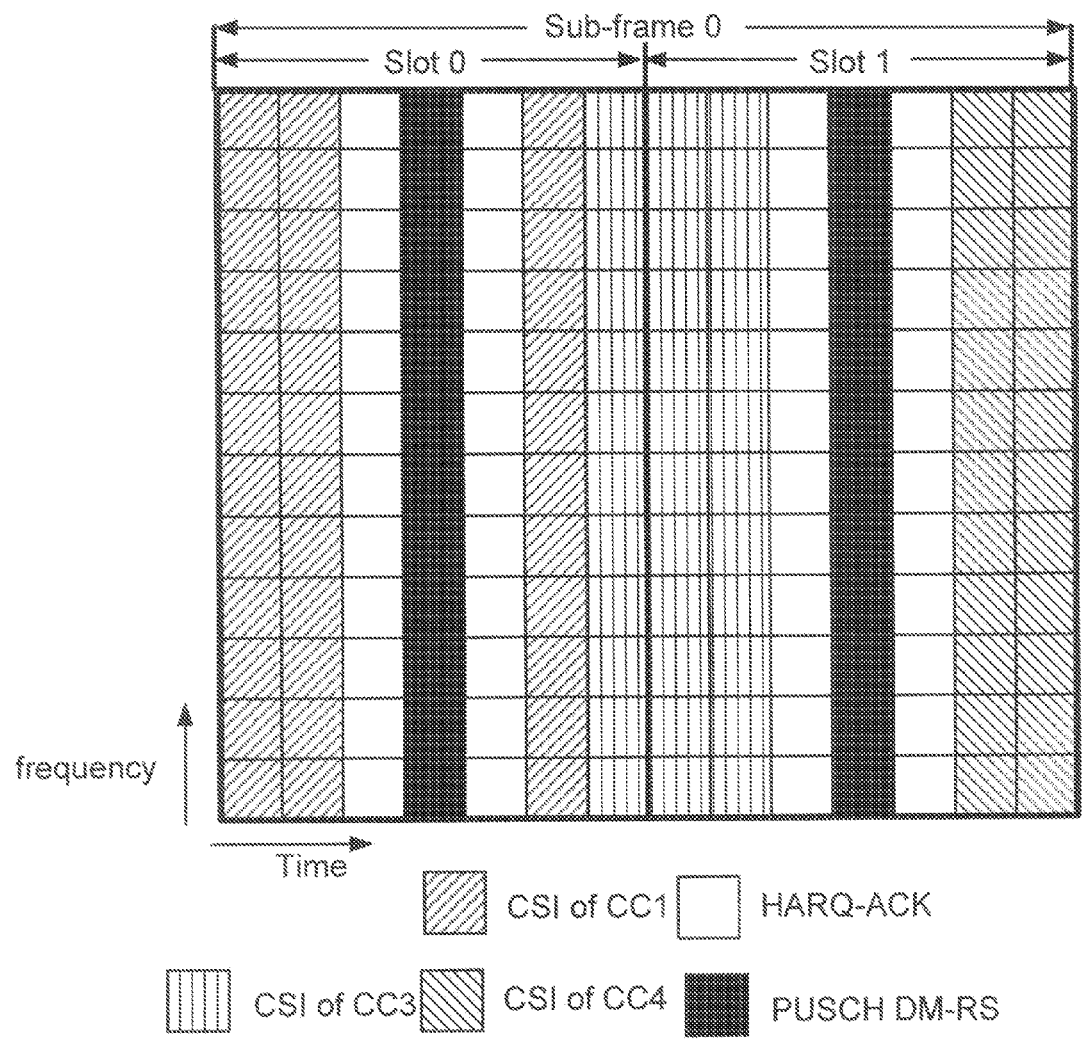

FIGS. 10a and 10b are illustrations of example subframes showing an alternative encoding of HARQ ACK/NACK information proximate to one or more reference symbols (RS). FIG. 10a illustrates a subframe including CSI for 4 carriers. The CSI information is distributed throughout the resource blocks, with CSI from one carrier being intermingled with CSI for another carrier. FIG. 10b illustrates the subframe of FIG. 10a including puncturing HARQ ACK/NACK transmissions. Referring to FIG. 10b, in contrast to FIG. 9b, the HARQ ACK/NACK data may be encoded proximate to one or more reference signals encoded within the resource block. As shown in FIG. 10b, the HARQ ACK/NACK data is encoded proximate to the PUSCH DM-RS puncturing the CSI for carrier 2. Accordingly, with reference to FIG. 10b, one option when constructing the subframe would be to layout the CSI assignments such that the CSI being punctured was mapped to the resource elements next to the reference symbols (e.g., any of columns 230 in FIG. 10a). The other CSI values would be further away from the reference symbols. To rotate through the different carriers when puncturing, the physical resource element CSI assignments could also rotate as a function of time (e.g. SFN). For example, CSI1 might be mapped to the REs next to the RS this time (and thus be punctured by the ACK/NACKs), while next time CSI2 might be mapped to those REs (and thus CSI2 gets punctured next time).

Figure 11:
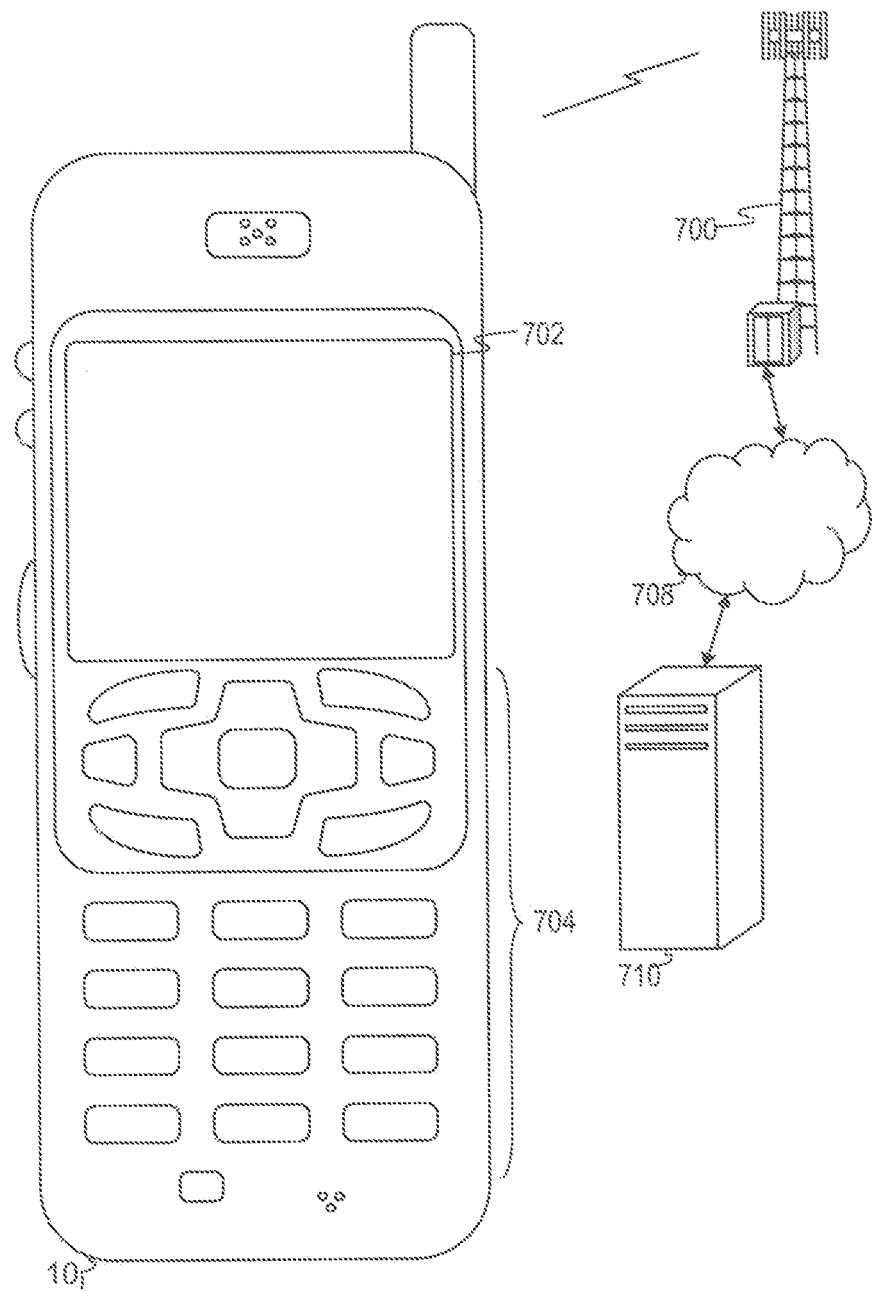
FIG. 11 is a diagram of a wireless communications system including a UE operable for some of the various embodiments of the disclosure.

FIG. 11 illustrates a wireless communications system including an embodiment of UE 10. UE 10 is operable for implementing aspects of the disclosure, but the disclosure should not be limited to these implementations. Though illustrated as a mobile phone, the UE 10 may take various forms including a wireless handset, a pager, a personal digital assistant (PDA), a portable computer, a tablet computer, or a laptop computer. Many suitable devices combine some or all of these functions. In some embodiments of the disclosure, the UE 10 is not a general purpose computing device like a portable, laptop or tablet computer, but rather is a special-purpose communications device such as a mobile phone, a wireless handset, a pager, a PDA, or a telecommunications device installed in a vehicle. The UE 10 may also be a device, include a device, or be included in a device that has similar capabilities but that is not transportable, such as a desktop computer, a set-top box, or a network node. The UE 10 may support specialized activities such as gaming, inventory control, job control, and/or task management functions, and so on.

The UE 10 includes a display 702. The UE 10 also includes a touch-sensitive surface, a keyboard or other input keys generally referred as 704 for input by a user. The keyboard may be a full or reduced alphanumeric keyboard such as QWERTY, Dvorak, AZERTY, and sequential types, or a traditional numeric keypad with alphabet letters associated with a telephone keypad. The input keys may include a trackwheel, an exit or escape key, a trackball, and other navigational or functional keys, which may be inwardly depressed to provide further input function. The UE 10 may present options for the user to select, controls for the user to actuate, and/or cursors or other indicators for the user to direct.

The UE 10 may further accept data entry from the user, including numbers to dial or various parameter values for configuring the operation of the UE 10. The UE 10 may further execute one or more software or firmware applications in response to user commands. These applications may configure the UE 10 to perform various customized functions in response to user interaction. Additionally, the UE 10 may be programmed and/or configured over-the-air, for example from a wireless base station, a wireless access point, or a peer UE 10.

Among the various applications executable by the UE 10 are a web browser, which enables the display 702 to show a web page. The web page may be obtained via wireless communications with a wireless network access node, a cell tower, a peer UE 10, or any other wireless communication network or system 700. The network 700 is coupled to a wired network 708, such as the Internet. Via the wireless link and the wired network, the UE 10 has access to information on various servers, such as a server 710. The server 710 may provide content that may be shown on the display 702. Alternately, the UE 10 may access the network 700 through a peer UE 10 acting as an intermediary, in a relay type or hop type of connection.

Figure 12:
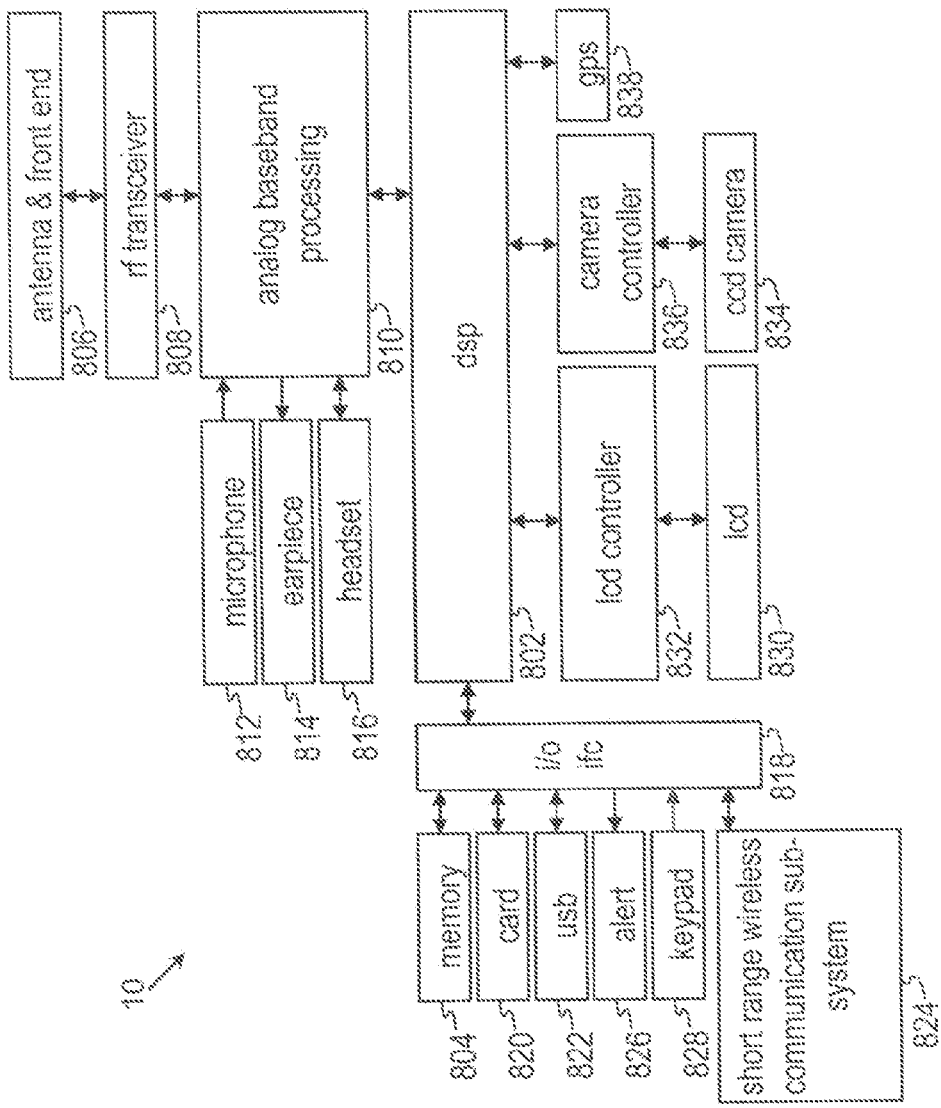
FIG. 12 is a block diagram of a UE operable for some of the various embodiments of the disclosure.

FIG. 12 shows a block diagram of the UE 10. While a variety of known components of UEs 110 are depicted, in an embodiment a subset of the listed components and/or additional components not listed may be included in the UE 10. The UE 10 includes a digital signal processor (DSP) 802 and a memory 804. As shown, the UE 10 may further include an antenna and front end unit 806, a radio frequency (RF) transceiver 808, an analog baseband processing unit 810, a microphone 812, an earpiece speaker 814, a headset port 816, an input/output interface 818, a removable memory card 820, a universal serial bus (USB) port 822, a short range wireless communication sub-system 824, an alert 826, a keypad 828, a liquid crystal display (LCD), which may include a touch sensitive surface 830, an LCD controller 832, a charge-coupled device (CCD) camera 834, a camera controller 836, and a global positioning system (GPS) sensor 838. In an embodiment, the UE 10 may include another kind of display that does not provide a touch sensitive screen. In an embodiment, the DSP 802 may communicate directly with the memory 804 without passing through the input/output interface 818.

The DSP 802 or some other form of controller or central processing unit operates to control the various components of the UE 10 in accordance with embedded software or firmware stored in memory 804 or stored in memory contained within the DSP 802 itself. In addition to the embedded software or firmware, the DSP 802 may execute other applications stored in the memory 804 or made available via information carrier media such as portable data storage media like the removable memory card 820 or via wired or wireless network communications. The application software may comprise a compiled set of machine-readable instructions that configure the DSP 802 to provide the desired functionality, or the application software may be high-level software instructions to be processed by an interpreter or compiler to indirectly configure the DSP 802.

The antenna and front end unit 806 may be provided to convert between wireless signals and electrical signals, enabling the UE 10 to send and receive information from a cellular network or some other available wireless communications network or from a peer UE 10. In an embodiment, the antenna and front end unit 806 may include multiple antennas to support beam forming and/or multiple input multiple output (MIMO) operations. As is known to those skilled in the art, MIMO operations may provide spatial diversity which can be used to overcome difficult channel conditions and/or increase channel throughput. The antenna and front end unit 806 may include antenna tuning and/or impedance matching components, RF power amplifiers, and/or low noise amplifiers.

The RF transceiver 808 provides frequency shifting, converting received RF signals to baseband and converting baseband transmit signals to RF. In some descriptions a radio transceiver or RF transceiver may be understood to include other signal processing functionality such as modulation/demodulation, coding/decoding, interleaving/deinterleaving, spreading/despreading, inverse fast Fourier transforming (IFFT)/fast Fourier transforming (FFT), cyclic prefix appending/removal, and other signal processing functions. For the purposes of clarity, the description here separates the description of this signal processing from the RF and/or radio stage and conceptually allocates that signal processing to the analog baseband processing unit 810 and/or the DSP 802 or other central processing unit. In some embodiments, the RF Transceiver 808, portions of the Antenna and Front End 806, and the analog base band processing unit 810 may be combined in one or more processing units and/or application specific integrated circuits (ASICs).

The analog baseband processing unit 810 may provide various analog processing of inputs and outputs, for example analog processing of inputs from the microphone 812 and the headset 816 and outputs to the earpiece 814 and the headset 816. To that end, the analog baseband processing unit 810 may have ports for connecting to the built-in microphone 812 and the earpiece speaker 814 that enable the UE 10 to be used as a cell phone. The analog baseband processing unit 810 may further include a port for connecting to a headset or other hands-free microphone and speaker configuration. The analog baseband processing unit 810 may provide digital-to-analog conversion in one signal direction and analog-to-digital conversion in the opposing signal direction. In some embodiments, at least some of the functionality of the analog baseband processing unit 810 may be provided by digital processing components, for example by the DSP 802 or by other central processing units.

The DSP 802 may perform modulation/demodulation, coding/decoding, interleaving/deinterleaving, spreading/despreading, inverse fast Fourier transforming (IFFT)/fast Fourier transforming (FFT), cyclic prefix appending/removal, and other signal processing functions associated with wireless communications. In an embodiment, for example in a code division multiple access (CDMA) technology application, for a transmitter function the DSP 802 may perform modulation, coding, interleaving, and spreading, and for a receiver function the DSP 802 may perform despreading, deinterleaving, decoding, and demodulation. In another embodiment, for example in an orthogonal frequency division multiplex access (OFDMA) technology application, for the transmitter function the DSP 802 may perform modulation, coding, interleaving, inverse fast Fourier transforming, and cyclic prefix appending, and for a receiver function the DSP 802 may perform cyclic prefix removal, fast Fourier transforming, deinterleaving, decoding, and demodulation. In other wireless technology applications, yet other signal processing functions and combinations of signal processing functions may be performed by the DSP 802.

The DSP 802 may communicate with a wireless network via the analog baseband processing unit 810. In some embodiments, the communication may provide Internet connectivity, enabling a user to gain access to content on the Internet and to send and receive e-mail or text messages. The input/output interface 818 interconnects the DSP 802 and various memories and interfaces. The memory 804 and the removable memory card 820 may provide software and data to configure the operation of the DSP 802. Among the interfaces may be the USB interface 822 and the short range wireless communication sub-system 824. The USB interface 822 may be used to charge the UE 10 and may also enable the UE 10 to function as a peripheral device to exchange information with a personal computer or other computer system. The short range wireless communication sub-system 824 may include an infrared port, a Bluetooth interface, an IEEE 802.11 compliant wireless interface, or any other short range wireless communication sub-system, which may enable the UE 10 to communicate wirelessly with other nearby mobile devices and/or wireless base stations.

The input/output interface 818 may further connect the DSP 802 to the alert 826 that, when triggered, causes the UE 10 to provide a notice to the user, for example, by ringing, playing a melody, or vibrating. The alert 826 may serve as a mechanism for alerting the user to any of various events such as an incoming call, a new text message, and an appointment reminder by silently vibrating, or by playing a specific pre-assigned melody for a particular caller.

The keypad 828 couples to the DSP 802 via the interface 818 to provide one mechanism for the user to make selections, enter information, and otherwise provide input to the UE 10. The keyboard 828 may be a full or reduced alphanumeric keyboard such as QWERTY, Dvorak, AZERTY and sequential types, or a traditional numeric keypad with alphabet letters associated with a telephone keypad. The input keys may include a trackwheel, an exit or escape key, a trackball, and other navigational or functional keys, which may be inwardly depressed to provide further input function. Another input mechanism may be the LCD 830, which may include touch screen capability and also display text and/or graphics to the user. The LCD controller 832 couples the DSP 802 to the LCD 830.

The CCD camera 834, if equipped, enables the UE 10 to take digital pictures. The DSP 802 communicates with the CCD camera 834 via the camera controller 836. In another embodiment, a camera operating according to a technology other than Charge Coupled Device cameras may be employed. The GPS sensor 838 is coupled to the DSP 802 to decode global positioning system signals, thereby enabling the UE 10 to determine its position. Various other peripherals may also be included to provide additional functions, e.g., radio and television reception.

Figure 13:
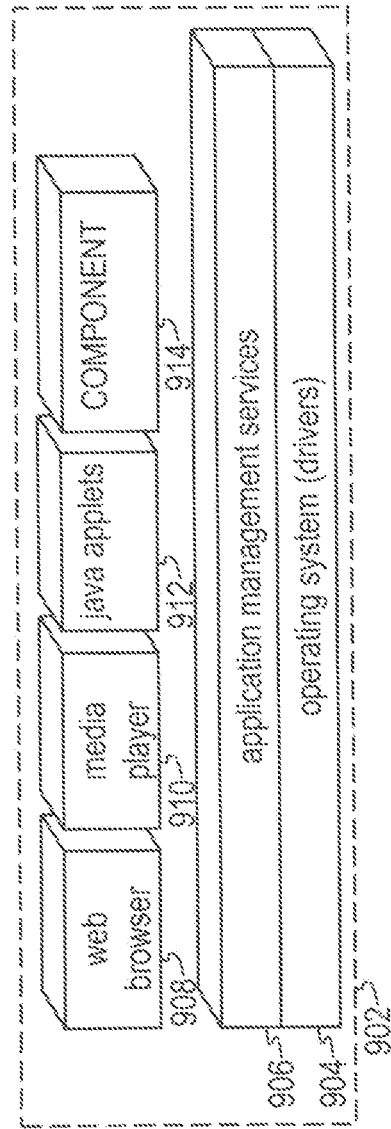
FIG. 13 is a diagram of a software environment that may be implemented on a UE operable for some of the various embodiments of the disclosure.

FIG. 13 illustrates a software environment 902 that may be implemented by the DSP 802. The DSP 802 executes operating system drivers 904 that provide a platform from which the rest of the software operates. The operating system drivers 904 provide drivers for the UE hardware with standardized interfaces that are accessible to application software. The operating system drivers 904 include application management services (AMS) 906 that transfer control between applications running on the UE 10. Also shown in FIG. 13 are a web browser application 908, a media player application 910, and Java applets 912. The web browser application 908 configures the UE 10 to operate as a web browser, allowing a user to enter information into forms and select links to retrieve and view web pages. The media player application 910 configures the UE 10 to retrieve and play audio or audiovisual media. The Java applets 912 configure the UE 10 to provide games, utilities, and other functionality. A component 914 might provide functionality described herein.

Figure 14:
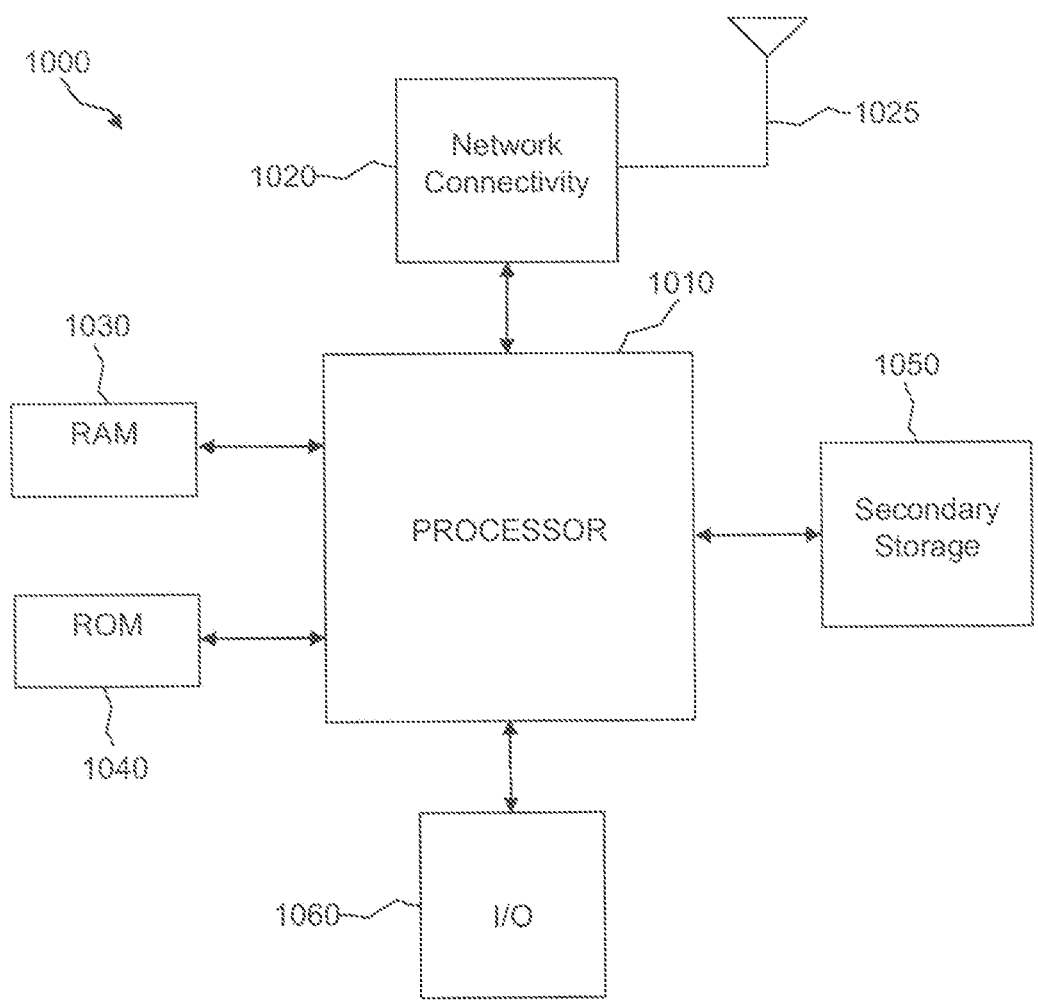
FIG. 14 is an illustrative general purpose computer system suitable for some of the various embodiments of the disclosure.

The UE 10, base station 120, and other components described above might include a processing component that is capable of executing instructions related to the actions described above. FIG. 14 illustrates an example of a system 1000 that includes a processing component 1010 suitable for implementing one or more embodiments disclosed herein. In addition to the processor 1010 (which may be referred to as a central processor unit (CPU or DSP), the system 1000 might include network connectivity devices 1020, random access memory (RAM) 1030, read only memory (ROM) 1040, secondary storage 1050, and input/output (I/O) devices 1060. In some cases, some of these components may not be present or may be combined in various combinations with one another or with other components not shown. These components might be located in a single physical entity or in more than one physical entity. Any actions described herein as being taken by the processor 1010 might be taken by the processor 1010 alone or by the processor 1010 in conjunction with one or more components shown or not shown in the drawing.

The processor 1010 executes instructions, codes, computer programs, or scripts that it might access from the network connectivity devices 1020, RAM 1030, ROM 1040, or secondary storage 1050 (which might include various disk-based systems such as hard disk, floppy disk, or optical disk). While only one processor 1010 is shown, multiple processors may be present. Thus, while instructions may be discussed as being executed by a processor, the instructions may be executed simultaneously, serially, or otherwise by one or multiple processors. The processor 1010 may be implemented as one or more CPU chips.

The network connectivity devices 1020 may take the form of modems, modem banks, Ethernet devices, universal serial bus (USB) interface devices, serial interfaces, token ring devices, fiber distributed data interface (FDDI) devices, wireless local area network (WLAN) devices, radio transceiver devices such as code division multiple access (CDMA) devices, global system for mobile communications (GSM) radio transceiver devices, worldwide interoperability for microwave access (WiMAX) devices, and/or other well-known devices for connecting to networks. These network connectivity devices 1020 may enable the processor 1010 to communicate with the Internet or one or more telecommunications networks or other networks from which the processor 1010 might receive information or to which the processor 1010 might output information.

The network connectivity devices 1020 might also include one or more transceiver components 1025 capable of transmitting and/or receiving data wirelessly in the form of electromagnetic waves, such as radio frequency signals or microwave frequency signals. Alternatively, the data may propagate in or on the surface of electrical conductors, in coaxial cables, in waveguides, in optical media such as optical fiber, or in other media. The transceiver component 1025 might include separate receiving and transmitting units or a single transceiver. Information transmitted or received by the transceiver 1025 may include data that has been processed by the processor 1010 or instructions that are to be executed by processor 1010. Such information may be received from and outputted to a network in the form, for example, of a computer data baseband signal or signal embodied in a carrier wave. The data may be ordered according to different sequences as may be desirable for either processing or generating the data or transmitting or receiving the data. The baseband signal, the signal embedded in the carrier wave, or other types of signals currently used or hereafter developed may be referred to as the transmission medium and may be generated according to several methods well known to one skilled in the art.

The RAM 1030 might be used to store volatile data and perhaps to store instructions that are executed by the processor 1010. The ROM 1040 is a non-volatile memory device that typically has a smaller memory capacity than the memory capacity of the secondary storage 1050. ROM 1040 might be used to store instructions and perhaps data that are read during execution of the instructions. Access to both RAM 1030 and ROM 1040 is typically faster than to secondary storage 1050. The secondary storage 1050 is typically comprised of one or more disk drives or tape drives and might be used for non-volatile storage of data or as an over-flow data storage device if RAM 1030 is not large enough to hold all working data. Secondary storage 1050 may be used to store programs that are loaded into RAM 1030 when such programs are selected for execution.

The I/O devices 1060 may include liquid crystal displays (LCDs), touch screen displays, keyboards, keypads, switches, dials, mice, track balls, voice recognizers, card readers, paper tape readers, printers, video monitors, or other well-known input/output devices. Also, the transceiver 1025 might be considered to be a component of the I/O devices 1060 instead of or in addition to being a component of the network connectivity devices 1020. Some or all of the I/O devices 1060 may be substantially similar to various components depicted in the previously described drawing of the UE 10, such as the display 702 and the input 704.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

Also, techniques, systems, subsystems and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component, whether electrically, mechanically, or otherwise. Other examples of changes, substitutions, and alterations are ascertainable by one skilled in the art and may be made without departing from the spirit and scope disclosed herein.

The invention claimed is:

1. A method for communicating channel state information (CSI) to a base station, comprising:
   identifying a number of allocated resources for CSI within at least one of a Physical Uplink Control CHannel (PUCCH) payload or a Physical Uplink Shared CHannel (PUSCH) payload;
   encoding channel state information (CSI) for activated carriers on a user equipment into the allocated resources for CSI; and
   when a number of activated carriers on the user equipment is less than the number of allocated resources for CSI, using repetition encoding in the PUCCH payload or the PUSCH payload to duplicate the CSI for at least one of the activated carriers on the user equipment.

2. The method of claim 1, including encoding a bitmap into the at least one of a PUCCH payload or a PUSCH payload, the bitmap at least one of indicating whether the at least one of a PUCCH payload or a PUSCH payload includes repetition-encoded CSI and identifying the activated carriers on the user equipment.

3. The method of claim 1, including:
receiving an indication from the base station identifying at least one of a PUCCH resource or a PUSCH resource for CSI; and
transmitting at least a portion of the encoded CSI using the identified at least one of a PUCCH resource or a PUSCH resource.

4. The method of claim 1, including encoding Hybrid Automatic Repeat reQuest Acknowledgement/Negative-Acknowledgement (HARQ ACK/NACK) data into at least one of the allocated resources for CSI.

5. The method of claim 4, including increasing a frequency of CSI reporting of the user equipment.

6. The method of claim 4, wherein encoding HARQ ACK/NACK data comprises puncturing a CSI for at least one of the activated carriers on the user equipment.

7. A method for receiving channel state information (CSI) from a user equipment, comprising:
receiving at least one of a Physical Uplink Control CHannel (PUCCH) payload or a Physical Uplink Shared CHannel (PUSCH) payload from the user equipment, the at least one of a PUCCH payload or a PUSCH payload including a number of allocated resources for channel state information (CSI);
when the number of allocated resources for CSI include duplicated CSI in the PUCCH payload or the PUSCH payload, determining that the user equipment has activated a number of carriers less than the number of allocated resources for CSI.

8. A user equipment, comprising:
a processor, the processor being configured to:
identify a number of allocated resources for CSI within at least one of a Physical Uplink Control CHannel (PUCCH) payload or a Physical Uplink Shared CHannel (PUSCH) payload;
encode channel state information (CSI) for activated carriers on a user equipment into the allocated resources for CSI; and
when a number of activated carriers on the user equipment is less than the number of allocated resources for CSI, use repetition encoding in the PUCCH payload or the PUSCH payload to duplicate the CSI for at least one of the activated carriers on the user equipment into the allocated resources for CSI.

9. The user equipment of claim 8, wherein the processor is configured to encode a bitmap into the at least one of a PUCCH payload or a PUSCH payload, the bitmap at least one of indicating whether the at least one of a PUCCH payload or a PUSCH payload includes repetition-encoded CSI and identifying the activated carriers on the user equipment.

10. The user equipment of claim 8, wherein the processor is configured to:
receive an indication from a base station identifying at least one of a PUCCH resource or a PUSCH resource for CSI; and
transmit at least a portion of the encoded CSI using the identified at least one of a PUCCH resource or a PUSCH resource.

11. The user equipment of claim 8, wherein the processor is configured to encode Hybrid Automatic Repeat reQuest Acknowledgement/Negative-Acknowledgement (HARQ ACK/NACK) data into at least one of the allocated resources for CSI.

12. The user equipment of claim 11, wherein the processor is configured to increase a frequency of CSI reporting of the user equipment.

* * * * *